(12) United States Patent  
Greenwall

(10) Patent No.: US 8,118,210 B2  
(45) Date of Patent: Feb. 21, 2012

(54) METHODS AND APPARATUS FOR APPLYING METALLIC CLADDING TO INTERIOR SURFACES OF PIPE ELBOWS

(75) Inventor: Norman Alexander Greenwall, Westaskiwin (CA)

(73) Assignee: 1272507 Alberta Ltd., Edmonton (CA)

( * ) Notice: Subject to any disclaimer, the term of this patent is extended or adjusted under 35 U.S.C. 154(b) by 0 days.

(21) Appl. No.: 13/104,705

(22) Filed: May 10, 2011

(65) Prior Publication Data

US 2012/0000966 A1    Jan. 5, 2012

Related U.S. Application Data

(63) Continuation of application No. 12/678,275, filed as application No. PCT/CA2007/001669 on Sep. 18, 2001, now Pat. No. 7,942,307.

(51) Int. Cl.  
*B23K 31/02* (2006.01)

(52) U.S. Cl. .......................................... 228/145; 228/244

(58) Field of Classification Search ................ None  
See application file for complete search history.

(56) References Cited

U.S. PATENT DOCUMENTS

| | | | | |
|---|---|---|---|---|
| 4,577,795 A | * | 3/1986 | Forner et al. | 228/29 |
| 5,205,469 A | * | 4/1993 | Capitanescu | 228/225 |
| 5,539,177 A | * | 7/1996 | Okuya et al. | 219/61 |
| 6,234,383 B1 | * | 5/2001 | Harmat et al. | 228/254 |
| 2011/0132880 A1 | * | 6/2011 | Kossowan | 219/76.14 |

FOREIGN PATENT DOCUMENTS

| | | | | |
|---|---|---|---|---|
| JP | 53-100150 A | * | 9/1978 | |
| JP | 58-077774 A | * | 5/1983 | |
| JP | 58-179567 A | * | 10/1983 | |
| JP | 10-052783 A | * | 2/1998 | |
| JP | 11-347726 A | * | 12/1999 | |
| JP | 2001-141667 A | * | 5/2001 | |
| JP | 2001-321944 A | * | 11/2001 | |

* cited by examiner

*Primary Examiner* — Kiley Stoner  
(74) *Attorney, Agent, or Firm* — Donald V. Tomkins

(57) ABSTRACT

An apparatus for applying a helical cladding bead to the interior surface of a pipe elbow has a rotor mounted to an elbow carriage so as to be rotatable about a primary axis. The elbow carriage is longitudinally movable parallel to the rotor's rotational axis. A radially-movable elbow collar is mounted to the rotor, and has means for mounting a first end of a pipe elbow. The second end of the elbow passes through a stationary frame with centering means for keeping the elbow's curved centerline tangential to the primary axis. A weld arm, extending from a weld arm carriage into the second end of the elbow, is sinuously configured so that it will not interfere with the elbow. The weld arm is rotatable about the primary axis in coordination with the rotor. A weld head is mounted at the extending end of the weld arm so as to remain spatially fixed regardless of rotation of the weld arm. An integrated drive mechanism rotates the rotor, moves the elbow carriage longitudinally, moves the elbow cradle radially, and rotates the weld arm in synchronization with the rotor, all in a coordinated fashion such that the elbow's center of rotation orbits around the primary axis in a plane perpendicular thereto. The elbow moves through the stationary frame at an average rate equal to one weld bead width per rotation, thus resulting in the deposition of a continuous helical weld bead cladding the interior surfaces of the elbow.

8 Claims, 26 Drawing Sheets

METHODS AND APPARATUS FOR APPLYING METALLIC CLADDING TO INTERIOR SURFACES OF PIPE ELBOWS

CROSS-REFERENCE TO RELATED APPLICATIONS

This application is a continuation, pursuant to 35 U.S.C. 120, of U.S. patent application Ser. No. 12/678,275 filed Mar. 15, 2010, now U.S. Pat. No. 7,942,307, which is the U.S. national stage of International Application No. PCT/CA2007/001669, filed on Sep. 18, 2007 and designating the United States. Both said earlier applications are incorporated herein by reference in their entirety for continuity of disclosure.

FIELD OF THE INVENTION

The present invention relates in general to methods and apparatus for applying metallic cladding materials to the interior surfaces of pipe. In particular, the invention relates to methods and apparatus for helical deposition of metallic cladding materials to interior surfaces of pipe, especially curved sections of pipe such as elbows.

BACKGROUND OF THE INVENTION

It is desirable in numerous industrial applications to armor the interior surfaces of metallic pipe with metallic cladding materials to protect against corrosion, abrasion, and/or surface contamination, and to provide improved impact resistance. For example, the processing of bitumen-laden sands (or "tar sands") to produce synthetic crude oil typically involves mixing the tar sands with liquid to form a slurry, which is then piped to a processing plant. Because of its high content of sand and/or rock particles, the flowing slurry is extremely abrasive and will readily wear away the kinds of steels most commonly used for industrial piping. Metals such as stainless steel and chromium alloys have much greater resistance to abrasion (and corrosion) than common steels, but in most cases it would be prohibitively expensive to use piping made of such metals, particularly for larger diameter pipe.

A common and less expensive alternative in highly abrasive or corrosive industrial applications is to use ordinary steel pipe internally clad or armored with a more abrasion-resistant and/or corrosion-resistant material such as stainless steel, tungsten carbide, or a chromium alloy. The pipe is typically clad by depositing the cladding metal on the internal surfaces of the pipe using methods well known in the field of automatic and semi-automatic electric arc welding. Metal cladding wire is continuously fed from a wire spool to an applicator head (or "weld head") disposed an optimal distance from the internal surface of a grounded pipe such that the introduction of an electrical current to the wire it will cause arcing between the wire and the pipe, in turn generating temperatures sufficient to melt the wire so that it will be deposited on and fused to the pipe. As with analogous welding procedures, the best results are typically achieved when this procedure is conducted in the "flat" position; i.e., with the surface to receive the molten metal being disposed beneath the weld head, as opposed to the "horizontal" and "overhead" positions (as those terms are commonly understood in the welding field).

The weld head is moved continuously relative to the pipe so that a continuous bead of metal cladding material is deposited on the pipe. This may be accomplished by moving the weld relative to the pipe, or vice versa. The mode of movement may be parallel to the pipe axis so to result in deposition of longitudinally-oriented cladding beads. It has been observed, however, that cladding beads oriented substantially parallel to the direction of flow appear to be more prone to abrasion than cladding beads oriented transversely to the flow direction. In addition, it has been observed that the application of cladding beads parallel to the flow direction tends to distort the cross-sectional shape of the pipe, due to residual stresses caused by differential cooling of the cladding beads.

For the foregoing reasons, it is preferable to use cladding beads that are of substantially circumferential orientation (i.e., transverse to flow direction), particularly in applications where the pipe is intended to carry highly abrasive materials such as tar sand slurries. It is possible to apply circumferentially-oriented cladding as a series of adjacent circular beads; however, this would involve repeated stopping and starting of the bead, which is inefficient and thus undesirable. As a practical matter, therefore, it is preferable to apply the cladding as a continuous helical bead.

Circumferential application of metallic cladding is relatively simple for straight sections of pipe. For example, the applicator head may be maintained in the "flat" position while the straight pipe is rotated around it. The pipe may be moved longitudinally relative to the applicator head after completion of each circumferential cladding bead, to allow the next bead to be deposited adjacent thereto. Preferably, however, the longitudinal movement of the pipe is continuous so that a continuous helical cladding bead will be deposited.

Helical application is considerably more difficult in the case of curved pipe sections such as pipe elbows. The procedure described above for cladding straight pipe is not workable with curved pipe. It is theoretically possible to apply helical cladding beads manually to a pipe elbow where the dimensions of the elbow permit manual access. However, this would entail an excessive amount of undesirable starting and stopping of the cladding bead due to the nearly constant need to reposition the elbow as the work progresses, particularly if it is being attempted to apply the cladding in the desirable "flat" position.

Because of the practical difficulties associated with helical cladding of elbows, longitudinal application methods are commonly used in spite of previously noted drawbacks. Moreover, this method is time-consuming, and therefore expensive. For these reasons, more efficient and economical means for helical cladding of elbows would be highly desirable.

Apparatus for helical application of cladding to curved pipe can be found in the prior art. Canadian Patent No. 2,282,134 and corresponding U.S. Pat. No. 6,234,383, issued to Harmat et al., disclose a rotatable framework having a curved cavity contoured to suit the shape of a curved pipe section which to receive internal metallic cladding. Guide tracks are provided along the sides of the cavity. Collars are fitted to each end of the pipe section, and the collars have wheels that engage the guide tracks so as to control the orientation of the pipe section as it moves into and through the cavity. One of the collars has a pair of guide pins that engage a guidance mechanism that is longitudinally movable so as to draw the pipe section progressively into the cavity as the framework is rotated about a longitudinal axis. The guidance mechanism has guide rails and other features adapted to compensate for the curvature of the pipe.

An elongate weld arm extends from one end of the framework into the cavity. At its outer end, the weld arm is fitted with a conventional weld head to which continuous welding wire is fed, for deposition on the interior surfaces of the pipe.

The weld arm is geometrically configured such that it will not interfere with a pipe section passing through the cavity, and such that it moves in an eccentric path similar to a skipping rope as the framework is rotated about the longitudinal axis. During this rotation, the weld head remains in a fixed longitudinal position while at the same time describing an orbital path around the longitudinal axis. The weld head is connected to the weld arm in a fashion such that it remains in a fixed orientation (e.g., with the welding wire always feeding downward, in the "flat" position) regardless of the orbital rotation of the weld head.

To operate the apparatus, the guidance mechanism draws the pipe section into the cavity until the pipe reaches the weld head, with the weld head in position to engage the pipe's interior surface. The framework and weld arm are then cooperatively rotated, in coordination with the guidance mechanism which gradually draws the pipe further into the cavity. The circular rotation of the weld head, combined with coordinated longitudinal movement of the pipe through the cavity, results in a continuous helical bead of metal being deposited on the interior surface of the pipe.

Although the Harmat apparatus may be effective for helical deposition of internal cladding of curved pipe sections, it has certain drawbacks and disadvantages. Different guide tracks and other components of the apparatus must be used for different pipe sizes and curvatures. The Harmat apparatus is not readily suited for use with pipe sections having comparatively small diameters (e.g., 12-inch diameter or smaller) and/or comparatively small curvature radii, nor does it appear to be possible to use the apparatus to clad 90-degree elbows (or even 45-degree elbows). In addition, the Harmat apparatus cannot be used, without difficulty or at all, with a curved pipe section having a straight transition section.

For the foregoing reasons, there is a need for apparatus for helical deposition of metallic cladding to interior surfaces of curved pipe sections, where the apparatus is readily configurable for use with pipe sections of different diameters, without needing to change or replace any components of the apparatus. There is a further need for such apparatus which is readily adaptable for internally cladding curved pipe sections having smaller diameters and curvature radii than can be clad using known apparatus. In addition, there is a need for such apparatus which can internally clad not only the internal surfaces of curved pipe sections but also the internal surfaces of straight transition sections connected thereto. The present invention is directed to these needs.

BRIEF DESCRIPTION

In a first aspect, the present disclosure teaches apparatus for applying a circumferentially-oriented metallic cladding bead around the interior surface of a pipe elbow. In the preferred embodiment, the apparatus applies the cladding bead in a helical pattern, but other bead application patterns are possible using alternative embodiments of the apparatus.

The apparatus is particularly adapted to cladding a pipe elbow having a uniform circular curvature; i.e., where the elbow centerline is uniformly curved about a center of curvature. The apparatus includes a stationary frame with a pipe opening adapted such that a pipe elbow can pass through it. In the preferred embodiment, the stationary frame is vertically oriented, although this is not essential to the invention. The apparatus further includes an elbow carriage with a rotor that is rotatable about a primary axis passing through the opening in the stationary frame. In the preferred embodiment, in which the stationary frame is vertically oriented, the primary axis will be horizontal. The frame has centering means for positioning the elbow within the pipe opening such that its curved centerline will remain substantially tangential to the primary axis as the elbow moves through the pipe opening (in a manner to be described in further detail herein), in a selected direction.

For optimal understanding of the apparatus and its operation, the frame may be considered as having associated with it a reference plane perpendicular to the primary axis and passing through or close to the pipe opening. In the preferred embodiment, in which the stationary frame and the pipe opening are vertically oriented, the reference plane will be a vertical plane.

The elbow carriage is positioned such that the rotor faces the stationary frame. The rotor has an elbow cradle (alternatively referred to herein as an "elbow collar") to which a first end of a pipe elbow can be swivelably mounted, with the swivel axis coinciding with a diameter of the elbow and lying in a plane substantially transversely perpendicular to the primary axis. The elbow cradle is mounted to the rotor such that its position is radially adjustable relative to the primary axis. By means of this arrangement, a pipe elbow can be mounted at a first end to the elbow cradle, with the second end of the elbow projecting through the pipe opening in the stationary frame.

In the preferred embodiment of the apparatus, counterweight means will be provided in association with the rotor, for counterbalancing forces imposed by an elbow mounted to the cradle. The counterweight means may be mounted to the rotor in a fixed position, in which case it will preferably be adapted such that its mass can be varied; e.g., by adding or removing weighted sections. In the preferred embodiment, the position of the counterweight means is radially adjustable, such that its operational effect can be varied without varying its mass. In an alternative embodiment, the counterweight is radially adjustable and its mass can be varied as well, to suit the mass of the elbow being clad.

The apparatus further includes elbow carriage drive means that can simultaneously and continuously rotate the rotor, move the elbow carriage in a selected direction parallel to the primary axis (either toward or away from the stationary frame), and adjust the radial position of the elbow collar on the rotor, either toward or away from the primary axis. These three modes of movement are coordinated, using suitable mechanical linkages and control systems (non-limiting examples of which are described hereinafter), such that when an elbow is mounted in the apparatus as described above, actuation of the elbow carriage drive means will cause the elbow to move a pre-set distance through the pipe opening during each rotation of the rotor, as measured at the intersection of the elbow centerline and the reference plane. This pre-set distance (which may be referred to as the pitch) will depend on the particular requirements of the cladding job being carried out, but will typically be equal to the desired average width of weld bead to be applied to the elbow, as measured along the elbow centerline.

As the rotor rotates, thus rotating the elbow cradle and the first end of the elbow around the primary axis, the elbow's center of curvature will also rotate about the primary axis, while at all times being substantially coincident with the reference plane.

In order for the movement of the elbow through the pipe opening to meet the foregoing operational criteria, the distance that the elbow carriage moves parallel to the primary axis during each rotor revolution (which distance may be referred to as $\Delta X$), and the distance that the elbow cradle moves radially relative to the primary axis during each rotor revolution ($\Delta Y$), will vary with each revolution. $\Delta X$ and $\Delta Y$ will correspond to the sides of a right triangle having a hypotenuse equal to the pitch (as previously defined), and these values will vary according to the position of the elbow relative to the stationary frame. This basic geometric relationship will apply regardless of the rotational position of the rotor.

The constantly changing nature of ΔX and ΔY during the operation of the elbow carriage drive means can be readily understood by considering an example case where a 90° elbow is being clad using the apparatus of the invention. In accordance with the preferred mode of operation of the apparatus, the elbow would be positioned in a medial orientation in the pipe opening such that substantially equal portions of the elbow protrude from either side of the opening. In this configuration, a radial line from the elbow's center of curvature to the elbow centerline at the elbow's first end (mounted to the elbow collar) would be oriented at a 45° angle relative to the primary axis (which is horizontal in the preferred embodiment). Next, the elbow carriage drive means would be actuated so as to draw the elbow through the pipe opening until the second end of the elbow reaches the pipe opening. During the first revolution of the rotor, the first end of the elbow would need to move horizontally away from the stationary frame by ΔX approximately equal to the cosine of 45° times the pitch, and the elbow cradle would need to move radially away from the primary axis by ΔY equal to the sine of 45° times the pitch. In this specific position, ΔX would be equal to ΔY, since sine 45° is equal to cosine 45°. With each further rotation of the rotor, however, ΔX would decrease and ΔY would increase (in accordance with the well-known Pythagorean theorem). As the second end of the elbow approaches the frame, having been rotated through a 45° angle, ΔX would approach zero, and ΔY would approach the pitch.

In the preferred embodiment of the apparatus, this geometrically-coordinated movement of the elbow carriage and the elbow collar is facilitated by providing, as a component of the elbow carriage drive means, a bull gear that serves as a template for the required movements of the elbow carriage and the elbow collar as the rotor rotates the first end of the elbow around the primary axis. This may be accomplished by means of suitable mechanical linkages, non-limiting examples of which will be described in further detail herein.

The apparatus also includes a rigid, sinuously-configured weld arm mounted to a weld arm carriage. This assembly is positioned on the side of the stationary frame opposite from the elbow carriage. The weld arm has a drive end and a free end. The drive end is mounted to the weld arm carriage such that it can be rotated around the primary axis, with the weld arm's free end extending in cantilever fashion toward the stationary frame, and with the weld arm's sinuous centerline coinciding, at the free end, with the primary axis. The free end of the weld arm extends to, or is capable of being extended to, a point close to or coincident with the aforementioned reference plane.

The sinuous configuration of the weld arm is selected or designed to suit the geometry of the particular pipe elbow (or elbows) to be clad using the apparatus of the invention. More specifically, the weld arm is shaped such that it can fit inside a pipe elbow extending through the stationary frame toward the weld arm carriage, without interference with the elbow. It will be appreciated that the specific shape of the weld arm will depend on the dimensional characteristics of the elbow or elbows to be clad, and the extent to which the elbow or elbows will be required to project through the stationary frame. Notably, however, the weld arm can be configured such that it can be used to clad elbows of different diameters.

The weld arm is hollow so as to define an internal passage extending from the drive end to the free end. A weld head linkage is disposed within the internal passage, and a weld head is connected to the weld head linkage at the free end of the weld arm. The weld head may be of any suitable type well known in the welding field, and will have associated means for feeding welding wire to the weld head.

In accordance with proper welding practice, the welding wire will preferably stick out approximately 1.0 to 1.5 inches from the end of the weld head. To facilitate the use of one weld arm for cladding elbows of different diameters, the weld head is preferably adapted to be fitted with extension elements so that the preferred "stick-out" can be maintained regardless of elbow size. For example, for a weld arm/weld head combination configured to clad elbows with a minimum diameter of 12 inches using a stick-out of 1.25 inches, the welding head would be fitted with a 6-inch extension in order to clad a 24-inch-diameter elbow using the same stick-out; i.e., the length of the required extension element would correspond to the difference in elbow radius.

The weld head linkage is designed and adapted such that the weld head does not rotate, so that the welding head can maintain a constant welding position (preferably the "flat" position, to use common welding terminology) in spite of the rotation of the weld arm. In the preferred embodiment, this is accomplished by fashioning the weld head linkage using a train of elongate shafts mounted inside the weld arm using suitable bearing means. The axes of adjacent shafts will intersect at an angle generally determined by the sinuous shape of the weld arm. Where two shafts meet, they engage each other by means of bevel gears mounted to the ends of the shafts. These bevel gears allow the angularly-offset shafts to "walk around" each other as the weld arm rotates. However, the shaft section nearest the weld head (and to which the weld held is mounted) is concentric with the primary axis, and therefore will not rotate.

In preferred embodiments, each shaft of the weld head linkage has a longitudinal central passage (most conveniently provided by making the shafts from round pipe), and each bevel gear has a central opening in communication with the central passages of adjacent shafts, so as to form the previously-mentioned continuous internal passage for feeding welding wire to the weld head. The central passage may also house auxiliary services which may be desired in various applications, such as conduits for shielding gas (if required), compressed air lines (for cooling and/or cleaning the weld head), electrical power (e.g., for powering a wire feed mechanism associated with the weld head), fiber optic cable (for a video camera mounted in association with the weld head, for monitoring cladding bead deposition), and vacuum lines (e.g., for removing flux from weld deposition areas, in applications using granular flux).

To clad the interior of a pipe elbow using the apparatus of the invention in the preferred mode of operation, a first end of the elbow is swivelably connected to the elbow collar and the other end of the elbow is disposed within the pipe opening of the stationary frame, in what may be referred to as a medial position or orientation; i.e., such that approximately equal portions of the elbow project on each side of the frame. The weld head is preferably oriented in the "flat" welding position, and with the tip of the welding wire disposed an appropriate distance from the interior surface of the elbow, such that a bead of molten metal from the wire will be deposited on the interior surface of the elbow upon introduction of a suitable electrical current into the wire (in accordance with well-known arc welding methods and technology (using either alternating current or direct current as desired or appropriate). To close the electrical circuit to enable arcing between the wire and the elbow, the elbow is grounded by connection to suitable grounding means associated with the rotor. The grounding means is adapted in accordance with known methods so as to rotate with the rotor while maintaining electrical conductivity with a grounding source.

The elbow carriage drive means is then activated so as to draw the elbow through the pipe opening in the fashion previously described (i.e., simultaneously rotating the first end of the elbow in orbital fashion around the primary axis, moving the elbow carriage horizontally away from the stationary frame, and moving the elbow cradle radially outward relative to the primary axis, in a manner corresponding to the changing geometric orientation of the elbow). At the same time, the weld arm is rotated around the primary axis in coordination with the rotation of the rotor, such that the weld arm at all time remains clear of the interior surfaces of the elbow, while the position of weld head remains fixed and non-rotating. Upon energizing the system, molten metal will thus be deposited on the interior surface of the elbow in a helical pattern.

When the elbow has moved to a terminal position in the stationary frame (i.e., when the helical cladding has reached a desired end point near the second end of the elbow), the elbow may be disengaged from the apparatus, rotated 180 degrees and remounted in a medial orientation with the welding wire positioned to begin depositing metal at or near where the completed bead began. The apparatus is then actuated as before so as to deposit cladding in a helical pattern on the remaining unclad portion of the interior surface of the elbow. When this second phase of the operation is complete, the elbow will be continuously helically clad. The entire process may be repeated one or more times if it is desired to apply two or more layers of cladding to the elbow.

Accordingly, in a first aspect the present invention is an apparatus for applying a helical cladding bead to interior surfaces of a circularly curved pipe elbow having a first end, a second end, a curved centerline, a center of curvature, and a plane of curvature, said apparatus comprising:

(a) an elbow carriage;
(b) a rotor mounted to the elbow carriage and rotatable about a primary axis;
(c) an elbow collar, to which the elbow may be removably mounted so as to be swivelable about a swivel axis, said swivel axis passing through the curved centerline and being substantially perpendicular to the elbow's plane of curvature;
(d) collar-mounting means, for mounting the elbow collar to the rotor such that:
  d.1 the elbow collar is movable along a radial path perpendicular to and passing through the primary axis; and
  d.2 the swivel axis is perpendicular to said radial path, and lies in a plane transversely perpendicular to the primary axis;
(e) a stationary frame defining a pipe opening, said frame being positioned such that:
  e.1 the rotor is oriented toward the stationary frame; and
  e.2 the primary axis passes through the pipe opening;
  said frame having associated with it a reference plane transversely perpendicular to the primary axis;
(f) centering means, for centering the pipe elbow within the pipe opening such that as the elbow passes through the pipe opening:
  f.1 the primary axis will coincide with the elbow's plane of curvature; and
  f.2 the primary axis will be substantially tangential to the elbow's curved centerline;
(g) elbow carriage drive means for simultaneously:
  g.1 rotating the rotor in a selected direction about the primary axis;
  g.2 moving the elbow carriage in a selected direction parallel to the primary axis; and
  g.3 moving the elbow collar in a selected radial direction relative to the primary axis;
  in coordinated fashion such that the pipe elbow, when swivelably connected at its first end to the elbow collar, with its second end disposed within the pipe opening, will pass through the pipe opening with its center of curvature rotating orbitally around the primary axis while remaining substantially coincident with the reference plane;
(h) a weld arm carriage positioned on the side of the stationary frame opposite the elbow carriage;
(i) a rigid, sinuously configured weld arm having a drive end, a free end, a sinuous centerline, and an internal passage extending continuously between said drive end and said free end, said weld arm being mounted to the weld arm carriage such that:
  i.1 the free end of the weld arm extends from the weld arm carriage toward the stationary frame; and
  i.2 the drive end of the weld arm is mounted to the weld arm carriage such that the weld arm is rotatable about the primary axis, with the weld arm centerline at the free end of the weld arm remaining substantially coincident with the primary axis;
  said weld arm being configured such that the weld arm may be positioned inside the pipe elbow when the elbow is positioned within the pipe opening of the stationary frame, without physically interfering with the elbow;
(j) weld arm rotation means, for rotating the weld arm about the primary axis in coordination with the rotation of the rotor, such that the weld arm will not interfere with the pipe elbow as it passes through the pipe opening of the stationary frame in response to actuation of the elbow carriage drive means;
(k) weld head linkage extending between the drive end and the free end of the weld arm within the internal passage thereof, said weld head linkage having a free end associated with the free end of the weld arm; and
(l) a weld head mounted to the free end of the weld head linkage such that its spatial orientation remains substantially fixed irrespective of rotation of the weld arm about the primary axis.

In the preferred embodiment, the apparatus comprises means for varying the rotational speed of the rotor during each rotation, to facilitate deposition of weld beads of substantially uniform thickness around the inner perimeter of the elbow. Because of the curvature of the elbow, the width covered by each pass of the weld head will be greater than the pitch (as previously defined) at points on the elbow where the distance to the elbow's center of curvature is greater than the elbow's radius of curvature (i.e., outboard of the elbow centerline), and less than the pitch at points on the elbow where the distance to the center of curvature is less than the radius of curvature (i.e., inboard of the elbow centerline). The variable-rate rotation means progressively slows the rotation of the rotor as the weld head moves from the most inboard zones of the elbow to the most outboard zones, and correspondingly increases the rotational speed of the rotor as the weld head moves from the most outboard zones toward the most inboard zones. Accordingly, the weld head dwells longer at outboard zones than at inboard zones, thereby facilitating the deposition of a weld bead of substantially uniform thickness around the circumference of the elbow if the wire feed rate to the weld head is kept constant.

The variable-rate rotation mechanism will of necessity be synchronized with the movements of the elbow carriage and the rotation of the weld arm carriage.

In alternative embodiments, uniform weld bead thickness may be achieved without varying the rotor's rate of rotation, by instead varying the wire feed rate.

In preferred embodiments, the apparatus is adapted to clad interior surfaces of straight transition sections attached to pipe elbows.

In a second aspect, the present disclosure teaches methods for applying a circumferentially-oriented metallic cladding bead around the interior surface of a pipe elbow.

BRIEF DESCRIPTION OF THE DRAWINGS

Embodiments of the invention will now be described with reference to the accompanying figures, in which numerical references denote like parts, and in which.

DETAILED DESCRIPTION

Figure 1:
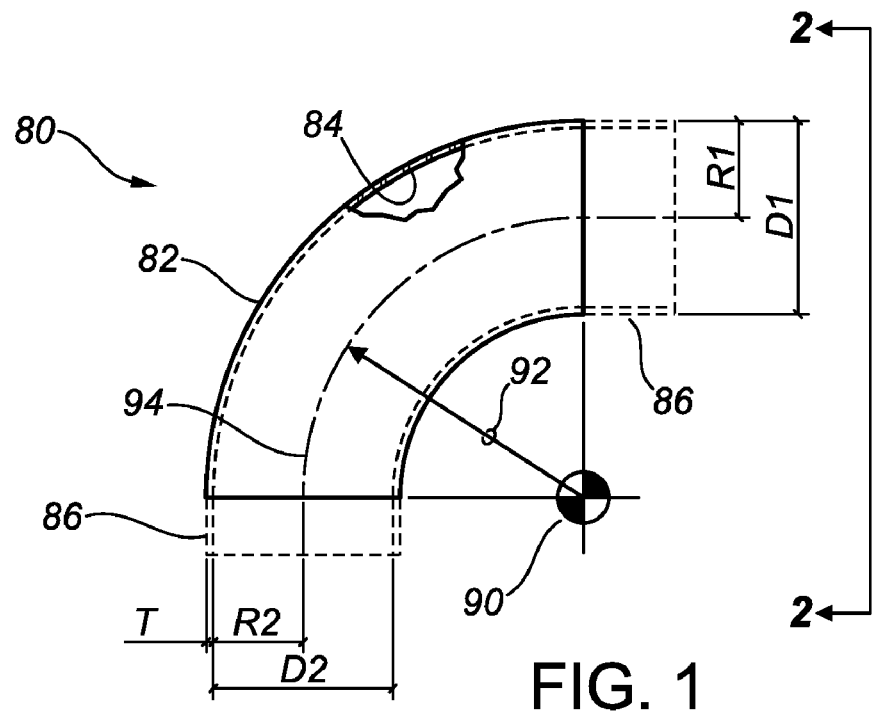
FIG. 1 is a side view of a circularly-curved pipe elbow, with associated geometric parameters indicated.
Figure 2:
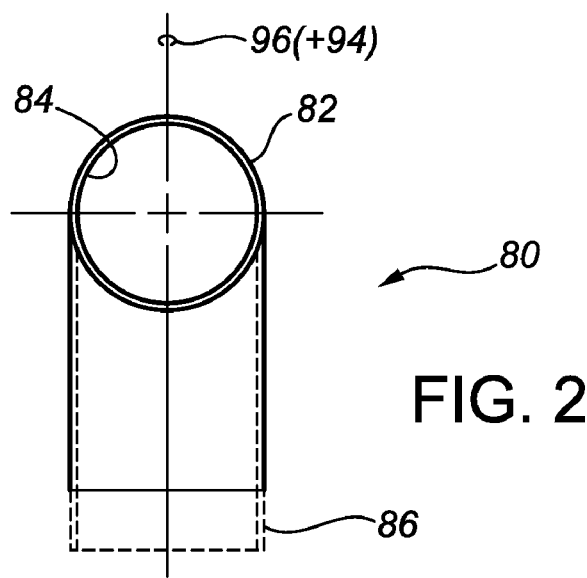
FIG. 2 is an end view of the pipe elbow shown in FIG. 1.

The apparatus of the present invention will be best understood by first reviewing FIGS. 1 and 2, which illustrate the basic geometric properties of a pipe elbow to be clad using the apparatus. As indicated in FIG. 1, pipe elbow 80 has outside diameter D1, outer radius R1, wall thickness T, inner diameter D2, inner radius R2, outer surface 82, and inner surface 84. Elbow 80 is circularly curved about a center of curvature 90, with a curved centreline 94 having a curvature radius 92. Elbow 80 may have a straight transition section 86 (or "tangent" section) at one or both ends; as will be seen, the present invention may be readily adapted to apply helical cladding to the inner surface of transition 86 as well as to inner surface 84 of the curved portion of elbow 80. As best seen in FIG. 2, elbow 80 is longitudinally bisected by a plane of curvature 96, with both center of curvature 90 and curved centreline 94 coinciding with or lying in plane of curvature 96.

Figure 3:
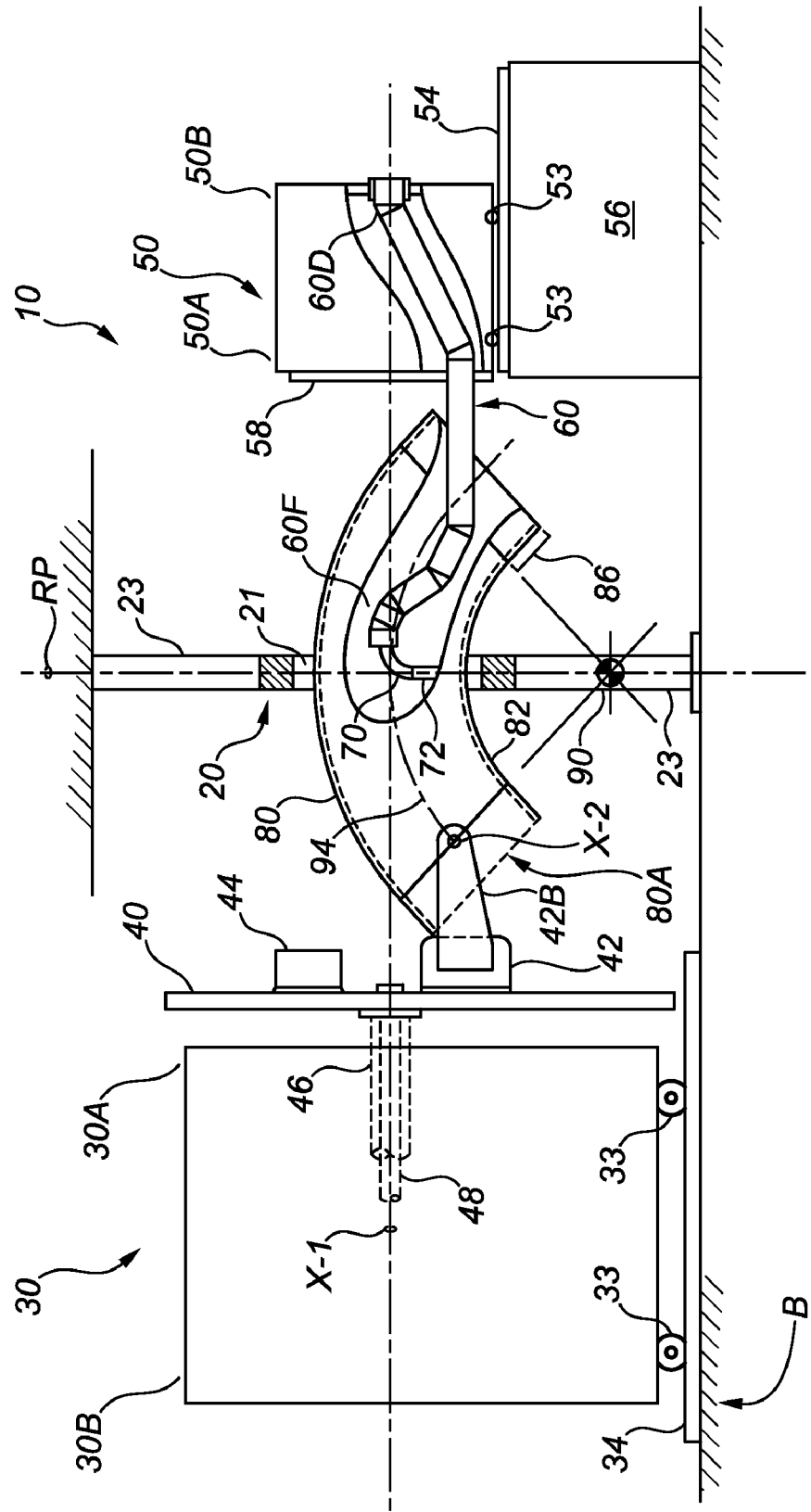
FIG. 3 is a schematic elevation of the apparatus of the invention in accordance with the preferred embodiment, shown with a pipe elbow in a medial position, and with the rotor in the six-o'clock position.

Referring now to FIG. 3, the apparatus of the present invention (generally indicated by reference numeral 10) comprises a stationary frame 20 having a pipe opening 21, with an elbow carriage 30 having an inner end 30A and an outer end 30B, a rotor 40 mounted to inner end 30A of elbow carriage 30 so as to be rotatable about a primary axis X-1, and a weld arm carriage 50 having an inner end 50A and an outer end 50B. A weld arm 60, sinuously configured and having an internally-disposed weld head linkage, is mounted to weld arm carriage 50, with weld arm 60 having a drive end 60D associated with weld head carriage 50 and a free end 60F extending toward frame 20.

Elbow carriage 30 is longitudinally movable parallel to primary axis X-1. The means by which this longitudinal movability is provided is not critical to the invention, and persons skilled in the art will readily appreciate that this can be accomplished in various ways using known technology and methods. In the preferred embodiment, as illustrated in the Figures, elbow carriage 30 longitudinally movable by means of rollers 33 which roll on tracks 34 mounted to a fixed base B (such as a foundation or floor structure).

Elbow carriage 30 may house components of an elbow carriage drive means an exemplary embodiment of which will be described in detail later in this specification. In the preferred embodiment, elbow carriage drive means is operably connected to a tubular primary drive shaft 46 and to a secondary drive shaft 48 which is coaxially disposed inside primary drive shaft 46. The functions and operational features of these drive shafts will be explained in detail later in this specification.

In FIGS. 3-7, elbow carriage 30 is shown in the form of a box-like enclosure, but the invention does not require the elbow carriage 30 to be of any particular shape or configuration.

Figure 7:
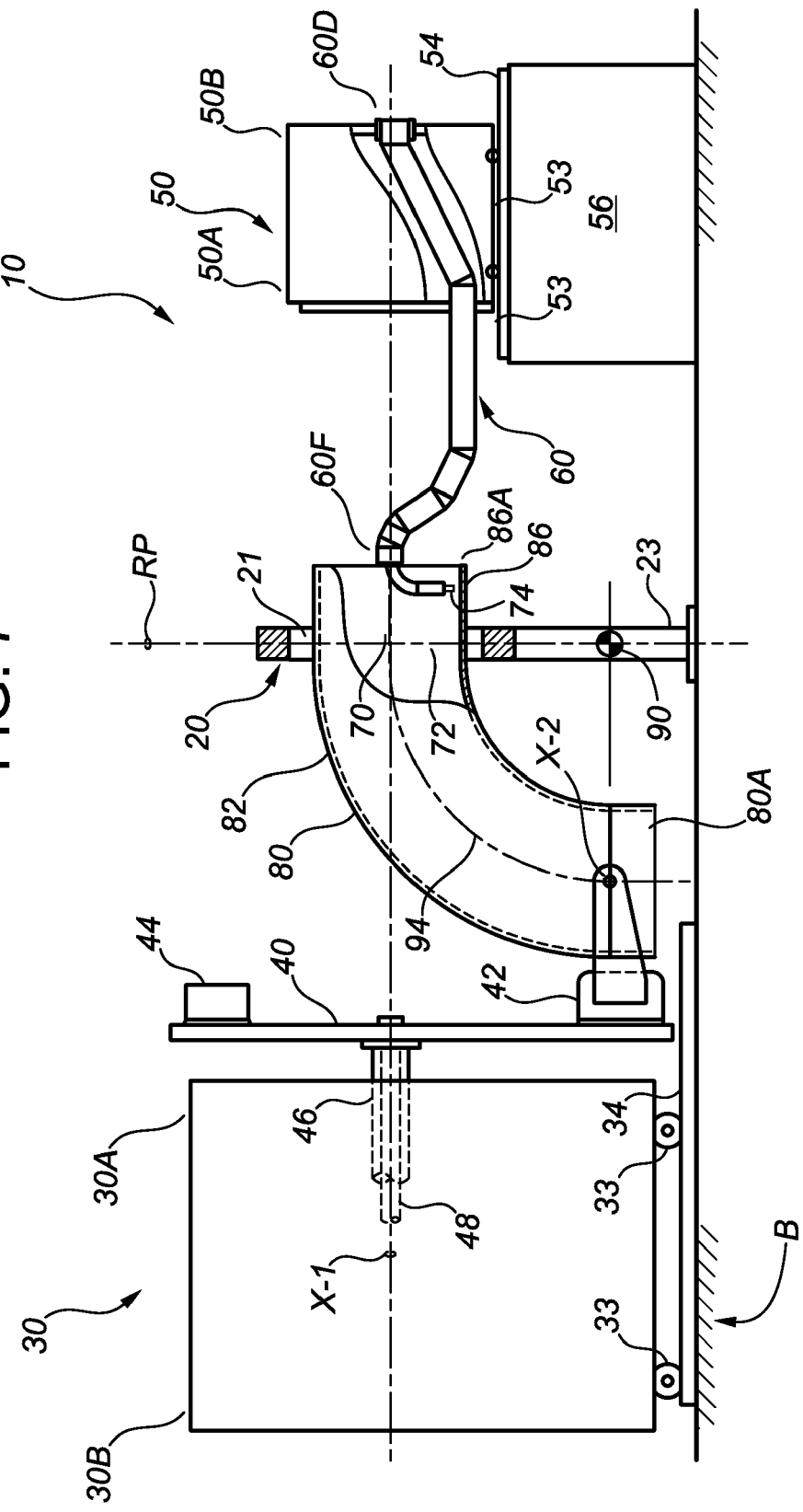
FIG. 7 is a schematic elevation of the apparatus being used to clad a pipe elbow having a straight transition section, and with the rotor in the six-o'clock position.
Figure 8:
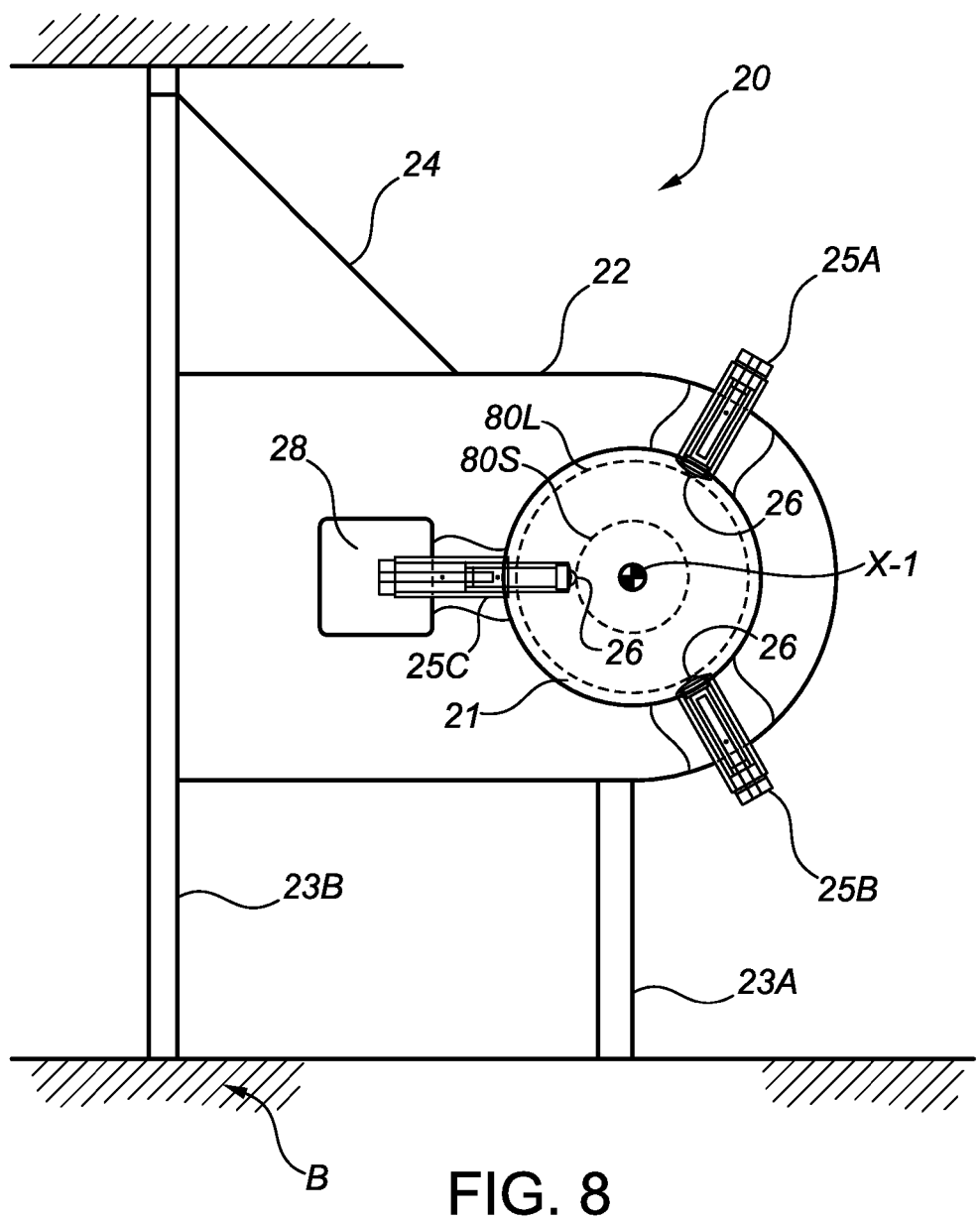
FIG. 8 is an elevation of the stationary frame of the apparatus in accordance with one embodiment of the invention (viewed looking from).

As best seen in FIG. 8, stationary frame 20 has a pipe opening 21 for receiving a pipe elbow in a manner as described in detail elsewhere herein. As may be seen in FIGS. 3-7, frame 20 is located a suitable distance from elbow carriage 30, with primary axis X-1 passing through opening 21. To facilitate proper understanding of the invention, frame 20 may be considered as having associated therewith a reference plane RP perpendicularly transverse to primary axis X-1. In FIGS. 3-7, reference plane RP is shown as being centered on frame 20, but this is not strictly essential. Reference plane RP may be shifted slightly toward one side or the other of frame 20 without departing from the invention, but reference plane RP will typically be disposed within the lateral width of frame 20.

In the embodiment shown in FIG. 8, frame 20 is fashioned from a pair of side plates 22 structurally supported on a main mast 23A and a secondary mast 23B. Optionally, secondary mast 23B may extend upward to an overhead support element (such as a structural component of a building) to provide enhanced lateral stability and stiffness to frame 20. Additional structural elements, such as gusset 24 shown in FIG. 8, may be used for additional stiffening. However, it is not essential to the invention for frame 20 to take any particular structural form, provided that it has a pipe opening 21 generally as described. In the embodiment shown in FIG. 8, pipe opening 21 is circular and has a continuous perimeter, but this is by way of example only. In alternative embodiments, pipe opening 21 could be non-circular in shape, and/or it could have a discontinuous perimeter, or it could take some other shape, without departing from the present invention.

Stationary frame 20 has centering means associated with pipe opening 21, for centering a pipe elbow 80 passing through the pipe opening such that curved centerline 94 of elbow 80 will be substantially tangential to primary axis X-1 at reference plane RP, irrespective of the longitudinal or rotational position of elbow 80 relative to frame 20. To state this a different way, the centering means provides a "steady rest" which positions elbow 80 such that curved centerline 94 will always substantially coincide with primary axis X-1 at the point where centerline 94 intersects reference plane RP.

Persons skilled in the art will appreciate that the centering means could take various forms using known technologies. In the preferred embodiment shown in FIG. 8, however, the centering means is in the form of three elbow guides 25 (individually designated, for descriptive purposes, as elbow guides 25A, 25B, and 25C) mounted to frame 20 in spaced relation around opening 21. Each elbow guide 25 can be radially extended or retracted (relative to primary axis X-1) so as to engage outer surface 82 of an elbow 80 passing through opening 21 of frame 20. Elbow guides 25 may take any of several forms that are known or readily devisable using known technology, such as hydraulic rams, pneumatically-actuated cylinders, and rack-and-pinion gear mechanisms. Preferably, each elbow guide 25 has, at its radially inward end, a freely rotatable ball or roller 26 or other suitable friction-reducing means which will engage outer surface 82 of elbow 80 as it passes through opening 21.

In the exemplary arrangement shown in FIG. 8, elbow guides 25 are housed in the space between side plates 22, one or both of which are provided with an access opening 28 for providing access to the radially outward portion of elbow guide 25C. It will be readily appreciated that the centering means could incorporate more than three elbow guides 25 without departing from the present invention. It will be further appreciated that it is not essential for elbow guides 25 to be housed between side plates 22 or otherwise disposed within the basic width of frame 20; for example, elbow guides 25 (or other form of centering means) could be mounted on the side of frame 20.

In the preferred embodiment, both opening 21 and elbow guides 25 are configured and adapted to accommodate pipe elbows 80 having different outside diameters D1. This can be best seen from FIG. 8, in which the perimeters of a larger-diameter elbow 80L and a smaller-diameter elbow 80S are shown in stippled outline. For conceptual illustrative purposes, elbow guides 25A and 25B are shown engaged with the outer surface 82 of larger-diameter elbow 80L, and elbow guide 25C is shown engaged with the outer surface 82 of smaller-diameter elbow 80S. In actual use of the apparatus, of course, all of the elbow guides 25 would be radially extended to the same extent, so as to engage the outer surface 82 of whatever size of elbow 80 is to be clad.

Figure 9:
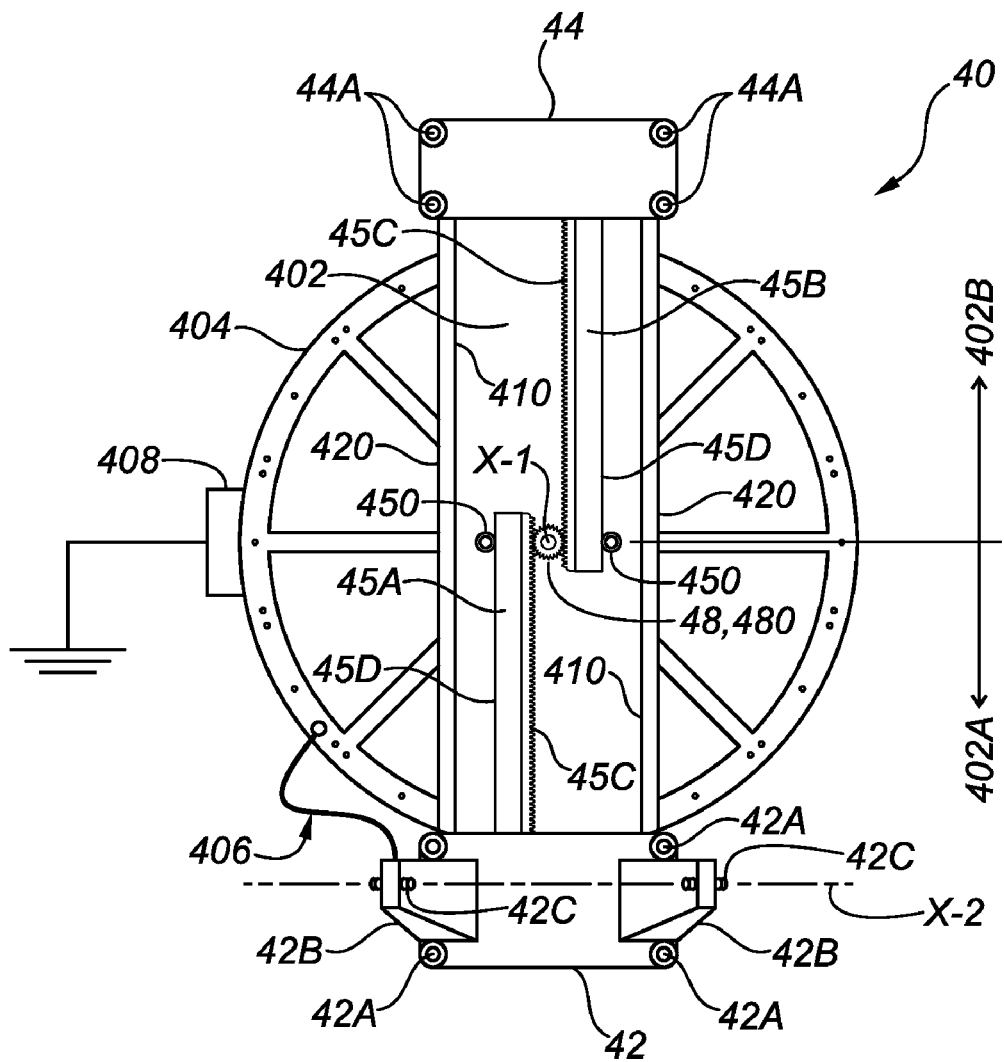
FIG. 9 is an elevation of the rotor and elbow collar of the apparatus in accordance with one embodiment (viewed looking from the stationary frame toward the rotor).

Rotor 40, which may take any form suitable to provide the functionality described herein, has an elbow collar 42 which is movable in a radial path toward or away from primary axis X-1. In the preferred embodiment, as shown in FIG. 9, rotor 40 includes a rotor arm 402 mounted to one face of a grounding wheel 404. One function served by grounding wheel 404 is to facilitate grounding of an elbow 80 being clad using the apparatus 10. A flexible grounding cable 406 of suitable length may be connected between grounding wheel 404 and elbow collar 42. As will be explained, elbow 80 is mounted to elbow collar 42 in a manner that establishes an electrically conductive connection therebetween. As grounding wheel 404 rotates, it is in constant sweeping contact with a grounding source 408 as conceptually illustrated in FIG. 9, thereby continuously grounding elbow 80 as rotor 40 rotates about primary axis X-1.

In the illustrated embodiments, rotor arm 402 has two parallel edges 410. For explanatory purposes, rotor arm 402 may be considered as having first and second sections 402A and 402B, one on either side of primary axis X-1. An elbow collar 42 is mounted to first section 402A so as to be movable along rotor arm 402 in a radial sense relative to primary axis X-1. In the preferred embodiment, this radial movability is facilitated by providing elbow collar 42 with V-grooved rollers 42A which run along tracks 420 associated with edges 410 of rotor arm 402.

Figure 10:
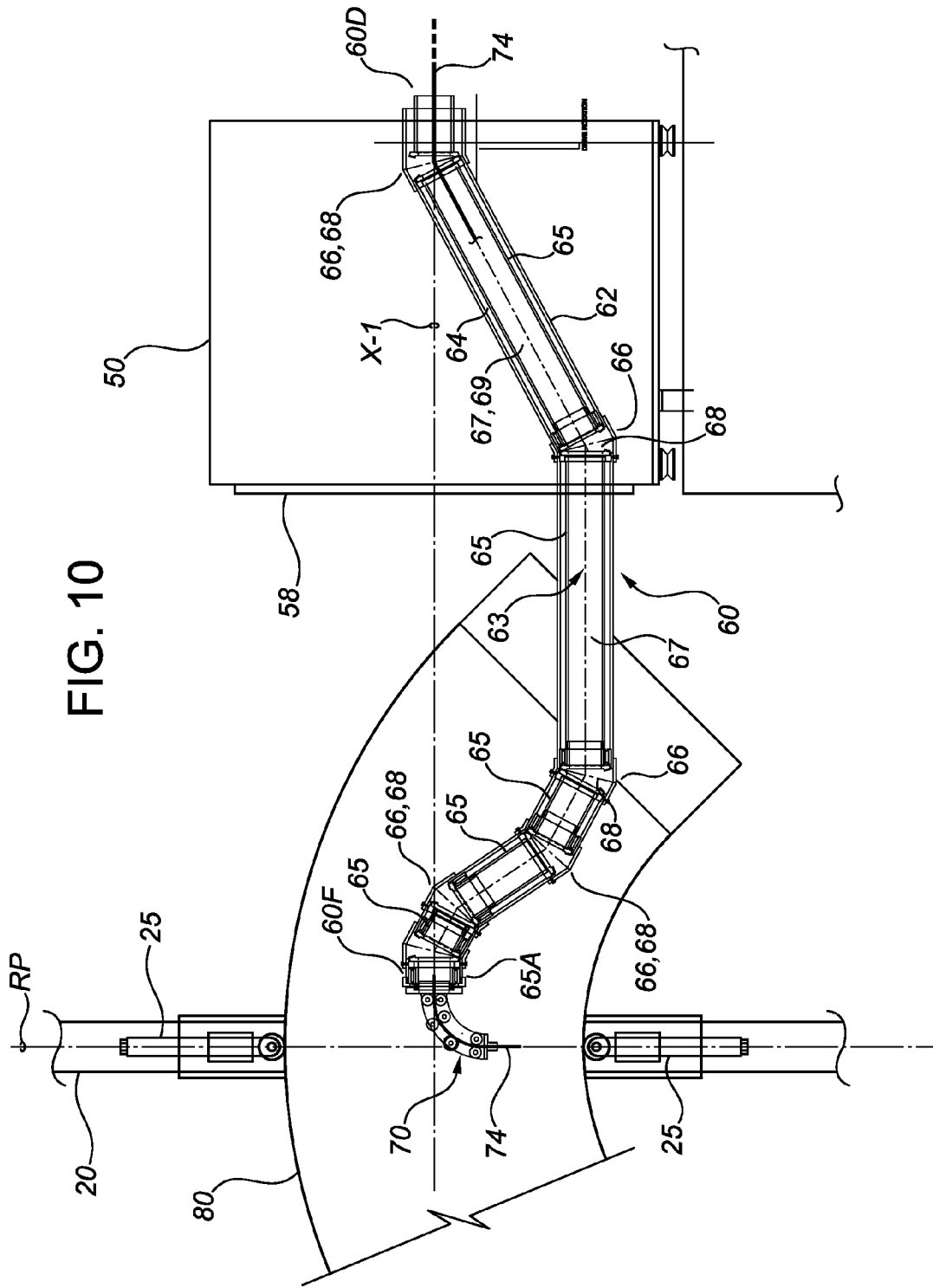
FIG. 10 is a cutaway elevation of a weld arm in accordance with the preferred embodiment.

Although not essential to the invention, it is highly preferable for the apparatus to have counterweight means 44 mounted in association with second section 402B of rotor arm 402 to enhance smoothness of operation of the apparatus. Counterweight means 44 will preferably be adapted so that its mass can be varied to suit particular applications (i.e., particular pipe elbow characteristics). As well, counterweight means 44 is preferably mounted to second section 402B so as to be radially movable along rotor arm 402 relative to primary axis X-1, with the radial movement of counterweight means 44 coordinated with the radial movement of elbow collar 42 such that they will both be moving either radially outward or radially inward. As shown in FIG. 10, the radial movability of counterweight means 44 is preferably facilitated by providing counterweight means 44 with V-grooved rollers 44A which run along tracks 420.

Figure 4:
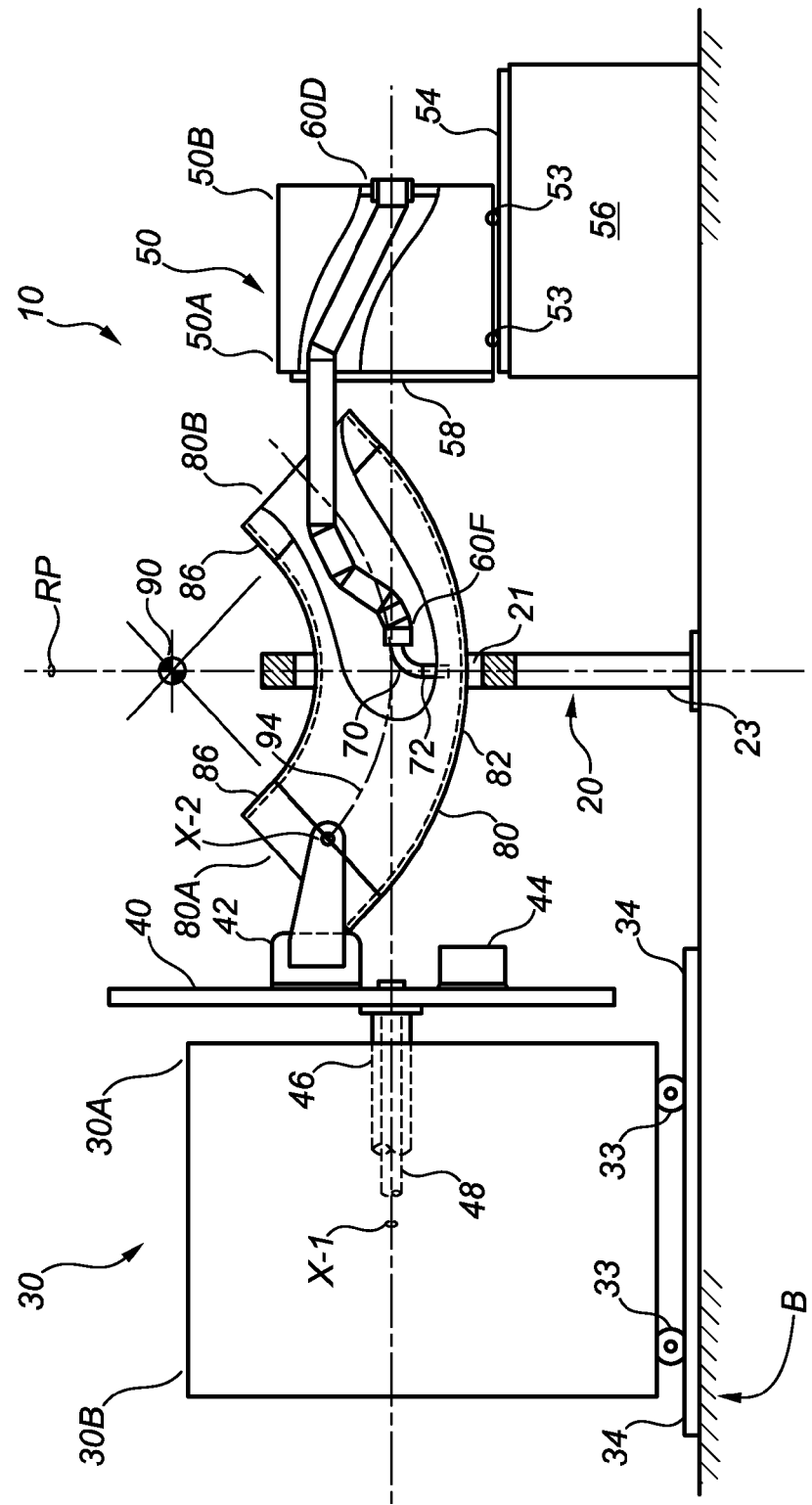
FIG. 4 is a schematic elevation of the apparatus with a pipe elbow in a medial position, and with the rotor in the twelve-o'clock position.

Elbow collar 42 is radially movable between an outboard position away from primary axis X-1 (as shown in FIGS. 5, 6, 7, and 9) and an inboard position nearer primary axis X-1 (as shown in FIGS. 3 and 4). Similarly, counterweight means 44 is radially movable between an outboard position away from primary axis X-1 (as in FIGS. 5, 6, 7, and 9) and an inboard position nearer primary axis X-1 (as in FIGS. 3 and 4). In the preferred embodiment, the coordinated radial movement of elbow collar 42 and counterweight means 44 along rotor arm 402 is enabled by a pair of spaced, parallel rack gears 45A and 45B as shown in FIG. 9. Rack gear 45A is connected to elbow collar 42, and is of sufficient length to extend at least slightly beyond primary axis X-1 and to a first side thereof when elbow collar 42 is in its outboard position, with the teeth of rack gear 45A oriented toward primary axis X-1. Similarly, rack gear 45B is connected to counterweight means 44 and extends at least slightly beyond primary axis X-1 and to a second side thereof when counterweight means 44 is in its outboard position, with the teeth 45C of rack gear 45B oriented toward primary axis X-1 (and thus toward the teeth of rack gear 45A). Guide rollers 450 may be mounted to rotor arm 402 so as to engage the non-toothed outer edges 45D of rack gears 45A and 45B. As indicated in FIG. 9 (and as explained in greater detail elsewhere in this specification), when rotor 40 is mounted to elbow carriage 30, inner end 48A of secondary drive shaft 48 extends through rotor 40 and has a pinion gear 480 which engages rack gears 45A and 45B (in a manner described later in this specification). Accordingly, rotation of secondary drive shaft 48 relative to rotor 40 will cause rotation of pinion gear 480, which in turn will cause rack gears 45A and 45B to move elbow collar 42 and counterweight means 44 radially inward (toward their inboard positions) or outward (toward their outboard positions), depending on the direction of rotation of secondary drive shaft 48.

As may be seen from FIGS. 3-7, 9, 14, and 15, elbow collar 42 has a pair of spaced side arms 42B extending toward stationary frame 20. A swivel axis X-2 passes through side arms 42B in an orientation such that swivel axis X-2 always lies in a plane perpendicularly transverse to primary axis X-1 irrespective of the radial position of elbow collar 42 and irrespective of the rotational position of rotor 40. In the illustrated embodiment, each side arm 42B has a pivot pin 42C aligned with swivel axis X-2, for pivoting engagement with a mounting ring 81 which may be temporarily connected to elbow 80 (by use of clamps, spot welding, and/or other suitable means). Mounting ring 81, which is conceptually illustrated in FIG. 15, may be of any suitable construction. When elbow 80 has been properly mounted in elbow collar 42, swivel axis X-2 will pass through a point on the curved centreline 94 of elbow 80.

Figure 14:
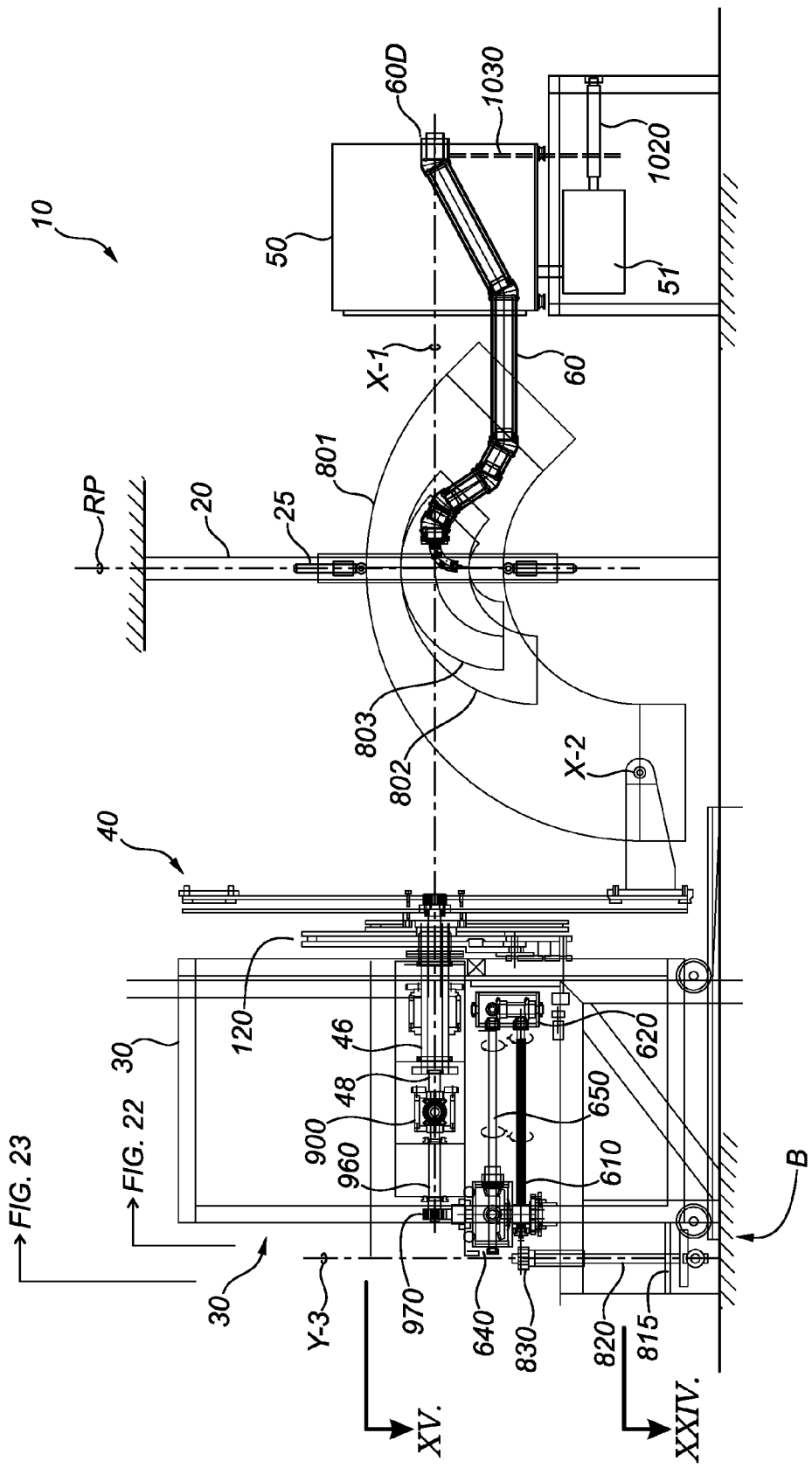
FIG. 14 is a cross-sectional elevation through a preferred embodiment of the apparatus, illustrating a preferred primary drive mechanism and variable-rate rotation mechanism.

Weld arm 60 is sinuously configured such that it can fit, without interference, inside a pipe elbow 80 passing through pipe opening 21 of frame 20. As indicated in FIG. 14, weld arm 60 may be configured to fit inside several different sizes of elbows of different diameters (as indicated for illustrative purposes by elbow outlines 801, 802, and 803). Weld arm 60 is rotatable about primary axis X-1 in coordination with the rotation of rotor 40 (and the corresponding rotation of pipe elbow 80) about primary axis X-1, such that weld arm 60 will remain non-interferingly disposed within elbow 80 as it rotates.

FIG. 10 illustrates a weld arm 60 in accordance with the preferred embodiment. Weld arm 60 has a rigid outer case 62 enclosing an internal passage 64 extending from drive end 60D to free end 60F of weld arm 60. To provide the general shape required for weld arm 60, outer case 62 has a series of segments, with adjacent segments being connected at nodes 66 where direction changes occur. A weld head linkage 63 is disposed within passage 64, and a weld head 70 is connected to linkage 63 at free end 60F of weld arm 60. Weld head linkage 63 is adapted such that weld head 70 will not rotate as weld arm 60 rotates about primary axis X-1, so that the welding head can maintain a constant welding position. In the illustrated embodiment, weld head linkage 63 includes a train of elongate shafts 65 mounted inside the weld arm using suitable bearings. Where two shafts 65 meet at a node 66, they engage each other by means of bevel gears mounted to the ends of shafts 65 (and generally indicated by reference numeral 68 in FIG. 10). Bevel gears 68 allow angularly-offset shafts 65 to "walk around" each other as weld arm 60 rotates. However, shaft section 65A nearest the weld head (and to which weld head 70 is mounted) is concentric with primary axis X-1, and therefore will remain non-rotatingly fixed in space as outer case 62 of weld arm 60 rotates about primary axis X-1.

Each shaft 65 has a longitudinal central passage 67, and each bevel gear 68 has a central opening in communication with the central passages 67 of adjacent shafts 65, so as to provide a continuous internal passage 69 for feeding welding wire 74 to weld head 70. As previously noted, continuous internal passage 69 may also be used to run additional utilities such as gas, air, and vacuum lines, as well as power lines and fiber optic cable to weld head 70.

Figure 11:
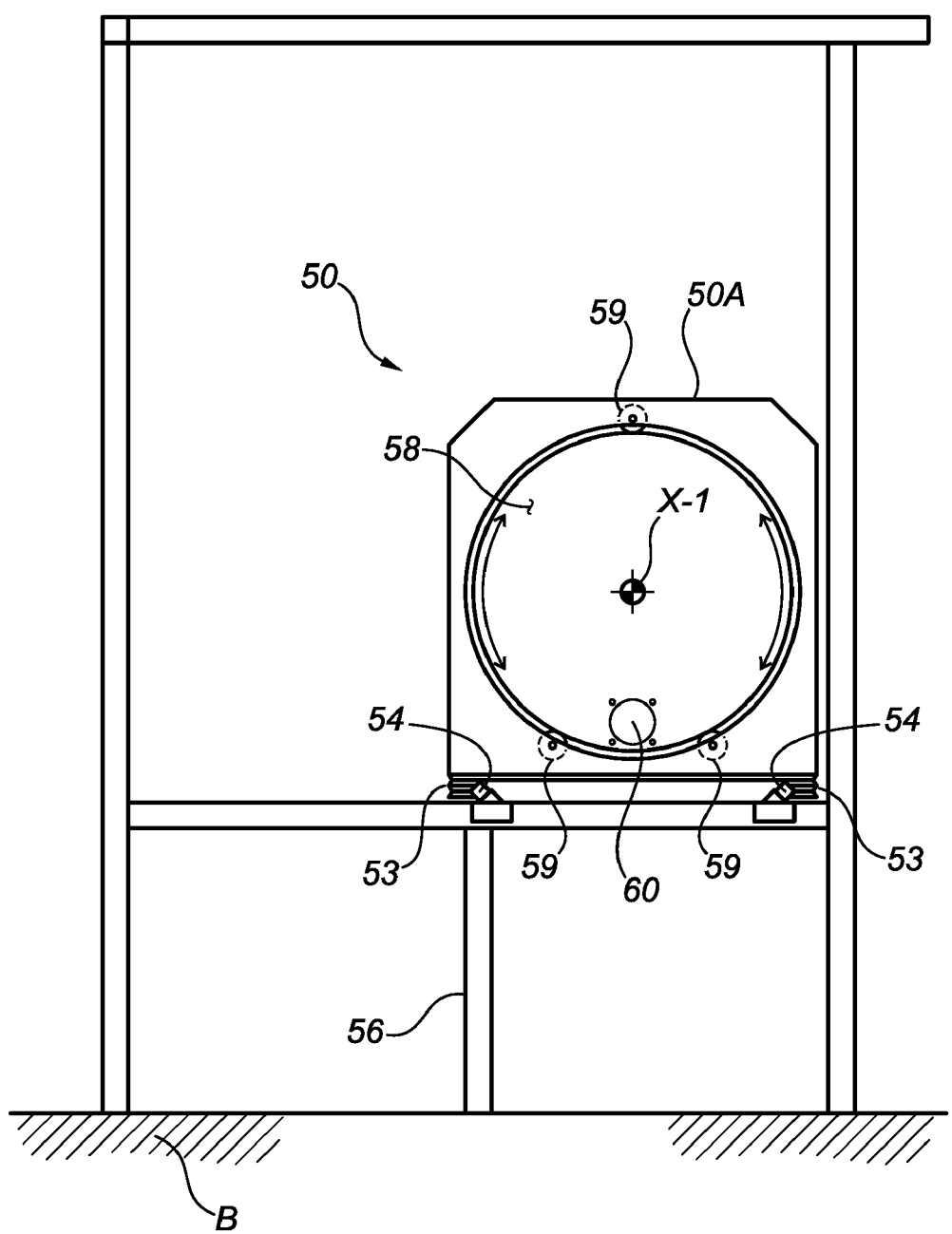
FIG. 11 is an elevational view of the weld arm carriage (viewed looking from the stationary frame toward the weld arm carriage), with the weld arm carriage turntable in the six-o'clock position.

In the illustrated embodiments, weld arm 60 passes through a turntable 58 mounted to inner end 50A of weld arm carriage 50 so as to be rotatable about primary axis X-1, with drive end 60D of weld arm 60 being rotatably mounted in association with outer end 50B of weld arm carriage 50 so as to be concentric with primary axis X-1. The point at which weld arm 60 passes through turntable 58, at a fixed distance radially outward from primary axis X-1, is indicated by reference character 60A. Turntable 58 may be of any suitable construction that achieves these operational requirements. In the preferred embodiment, as shown in FIG. 11, turntable 58 is in the form of a disk rotatably mounted to weld arm carriage 50 and guided by a plurality of guide rollers 59 mounted to weld arm carriage 50 around the periphery of turntable 58.

A suitable weld arm rotary drive means is provided to rotate weld arm 60 about primary axis X-1. By virtue of its sinuous configuration, weld arm 60 will rotate in an orbital fashion (much like a skipping rope). The particular nature of the weld arm rotary drive means is not critical to the invention; what is important is that it will rotate weld arm 60 about primary axis X-1 in synchronous coordination with the rotation of rotor 40 and elbow 80 about primary axis X-1. In alternative embodiments, the weld arm rotary drive means could rotate turntable 58 directly. In the preferred embodiment, however, and as will be described in detail further on in this specification, the weld arm rotary drive means is directly engaged with drive end 60D of weld arm 60, and even more preferably will be integrated with the elbow carriage drive means.

In the preferred embodiment of the invention, weld arm 60 is movable in either direction parallel to primary axis X-1, to facilitate cladding of a straight transition section 86 on either end of elbow 80. In the illustrated embodiments, this mode of movement is enabled by having weld arm carriage 50 movable in either direction parallel to primary axis X-1. For this purpose, weld arm carriage 50 in the preferred embodiment is mounted with rollers 53 that run on tracks 54, with any suitable weld arm carriage drive means (conceptually indicated by reference character 51 in FIG. 14) being provided for moving weld arm carriage 50 parallel to primary axis X-1 as may be required. Persons skilled in the art will readily appreciate that various types and combinations of rollers, tracks, and drive mechanisms could be used for this purpose, and that other means of facilitating guided movability of weld arm carriage 50 are possible without departing from the present invention.

In FIGS. 3-7, weld arm carriage 50 is shown positioned atop an elevated stationary base 56, but this arrangement is exemplary only, and not essential to the invention.

Weld head 70 may be of any suitable type capable of being fed with continuous welding wire 74, from a spool (not shown) associated with weld arm carriage 50, through internal passage 620 of weld arm 60. By using a suitable weld head extension 72, weld head 70 can be easily adapted to clad pipe elbows 80 of different diameters while maintaining a desired welding wire "stick-out". This can be appreciated particularly well with reference to FIG. 5, in which welding wire 74 may be seen extending downward from weld head extension 72.

The preferred mode of operation of the apparatus 10 may now be understood with reference to FIGS. 3-7. A pipe elbow 80 is positioned within pipe opening 21 of stationary frame 20, preferably in a medial orientation in which approximately equal portions of elbow 80 extend from either side of frame 20, with a first end 80A of elbow 80 mounted to elbow cradle 42 so as to be swivelable about swivel axis X-2, with swivel axis X-2 passing through curved centreline 94 perpendicular to curvature plane 96, and with center of rotation 90 of elbow 80 substantially coinciding with reference plane RP.

Figure 5:
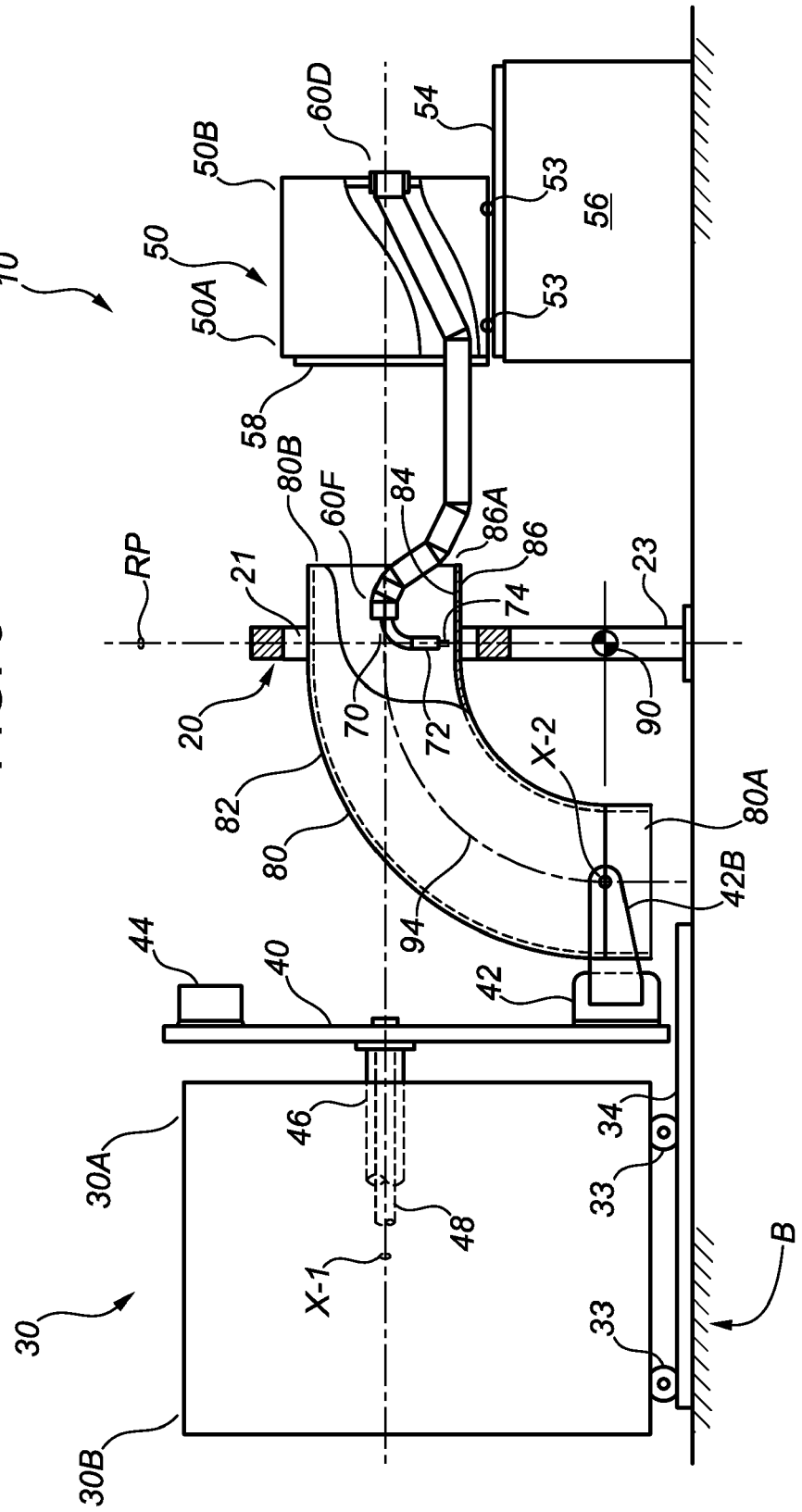
FIG. 5 is a schematic elevation of the apparatus with a pipe elbow in a terminal position, and with the rotor in the six-o'clock position.

The initial set-up of elbow 80 in the apparatus 10 may be carried out in more than one way, but it will preferably commence with the positioning of elbow 80 generally as shown in FIG. 5. Suitable hoist means (not forming part of the invention) may be provided to facilitate positioning of elbow 80. Weld arm carriage 50 is then moved toward frame 20 so as to position weld arm 60 inside elbow 80 with weld head 70 in close proximity to reference plane RP. At this stage, the longitudinal position of weld arm carriage 50 is temporarily fixed. Elbow carriage 30 is then moved longitudinally away from frame 20, while elbow cradle 42 is moved radially toward primary axis X-1 (in coordinated fashion with the movement of elbow carriage 30 so as to keep center of rotation 90 of elbow 80 substantially coincident with reference plane RP), until the apparatus 10 and elbow 80 are oriented generally as shown in FIG. 3. As shown in FIG. 3, elbow 80 may be considered as being in a "medial" position (meaning that it is approximately centered relative to frame 20), with elbow cradle 42 (and counterweight means 44) in an inboard position (relative to primary axis X-1).

To begin applying metallic cladding to the interior surfaces of elbow 80, from a starting point at which elbow 80 is in a medial position as described, the elbow carriage drive means and the weld arm rotary drive means are actuated such that:

rotor 40 continuously rotates clockwise about primary axis X-1 (note that unless otherwise indicated expressly or by context, all references herein to clockwise or counterclockwise rotation are as viewed looking from elbow carriage 30 toward weld arm carriage 50);

elbow cradle 42 continuously moves along rotor 40 in a radial direction away from primary axis X-1;

elbow carriage 30 continuously moves longitudinally away from frame 20 parallel to primary axis X-1;

weld arm 60 continuously rotates clockwise about primary axis X-1, in synchronization with the rotation of rotor 40; and welding wire 74 is continuously fed to weld head 70, with the welding circuit being energized and with elbow 80 being suitably grounded;

with the longitudinal movement of elbow carriage 30 and the radial movement of elbow cradle 42 being coordinated such that center of rotation 90 of elbow 80 at all times remains substantially coincident with reference plane RP.

In order for the movement of elbow 80 through pipe opening 21 to meet the foregoing operational criteria, the incremental distance $\Delta X$ that elbow carriage 30 moves toward or away from stationary frame 20 during each revolution of rotor 40, and the incremental distance $\Delta Y$ that elbow carriage 30 moves radially toward or away from primary axis X-1 during each revolution of rotor 40, will vary with each revolution. $\Delta X$ and $\Delta Y$ will correspond to the sides of a right triangle having a hypotenuse equal to pitch P (as previously defined), and these values will vary according to the position of elbow 80 relative to stationary frame 20. This basic geometric relationship will apply regardless of the rotational position of rotor 40.

Figure 12A:
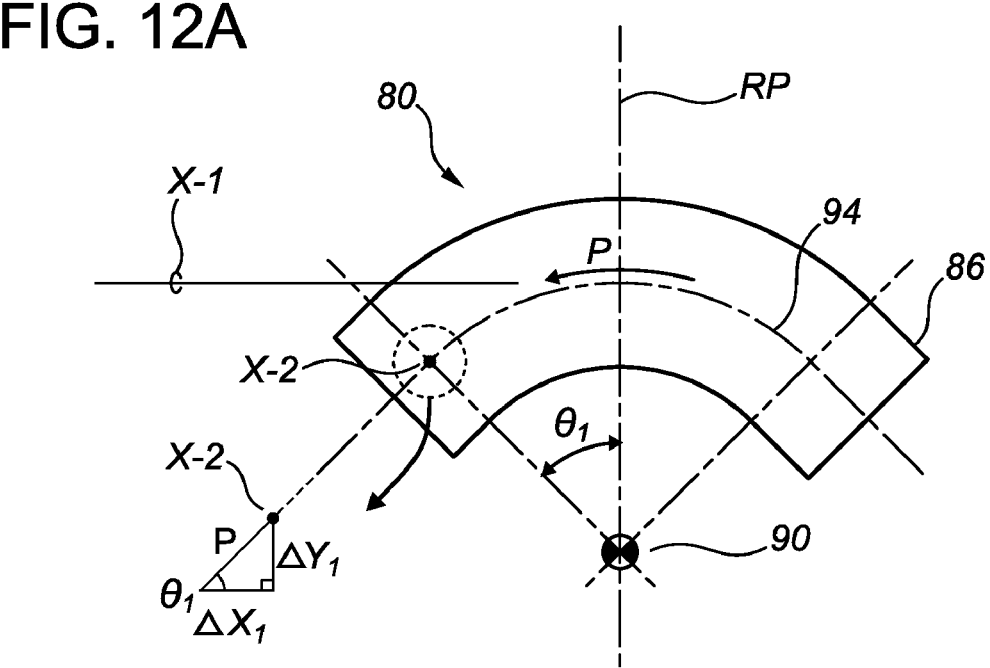
FIGS. 12A and 12B are schematic free-body diagrams of a pipe elbow illustrating the geometrical relationship between longitudinal movements of the elbow carriage and radial movements of the elbow collar for different positions of the elbow relative to the stationary frame.

The constantly changing nature of $\Delta X$ and $\Delta Y$ during the operation of the elbow carriage drive means can be readily understood by considering an example case where a 90-degree elbow is being clad using the apparatus of the invention. This case is schematically illustrated in the free-body diagrams shown in FIGS. 12A and 12B. FIG. 12A shows a 90-degree elbow 80 in an initial medial position within pipe opening 21 (i.e., centered about reference plane RP). In this initial position, the angle θ between reference plane RP and a line drawn between swivel axis X-2 and center of curvature 90 is 45° ($\theta_1$). When elbow 80 is rotated counterclockwise about center of curvature 90 from this initial medial position by a distance P (as measured at curved centreline 94), the incremental distance $\Delta X_1$ through which swivel axis X-2 moves horizontally will be approximately equal to P cosine θ, and the incremental distance $\Delta Y_1$ through which swivel axis X-2 moves radially relative to primary axis X-1 will be approximately equal to P sine $\theta_1$. Since $\theta_1$ is 45° in FIG. 12A, and since sine 45° equals cosine 45° (i.e., 0.707), $\Delta X_1$ and $\Delta Y_1$ will both be approximately equal to 0.707 P as elbow 80 begins to move from its initial medial set-up.

Figure 12B:
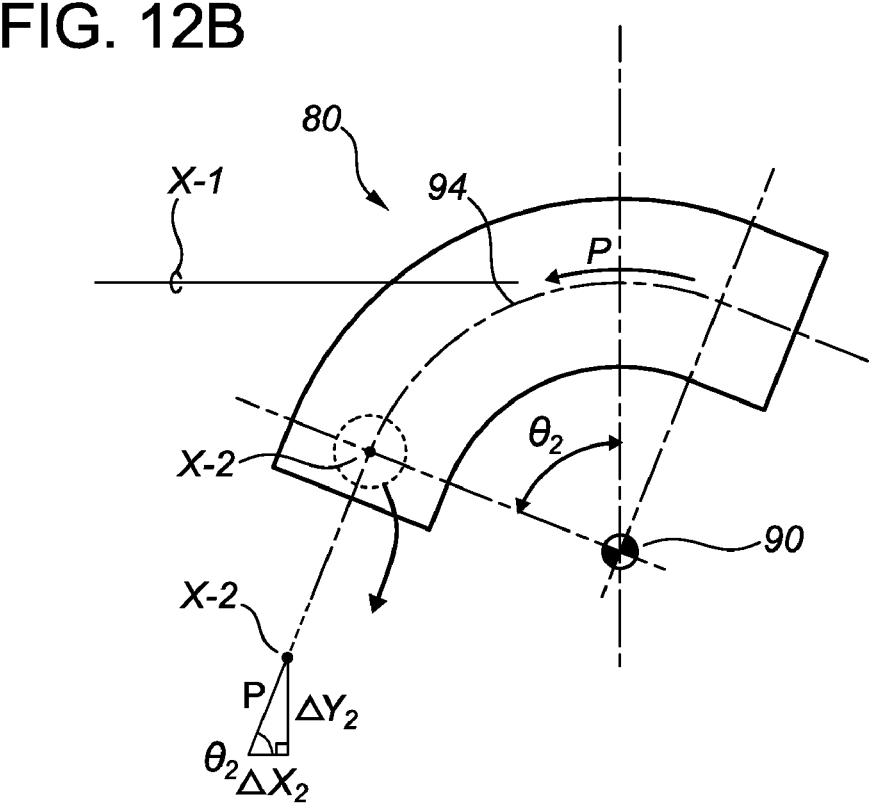

FIG. 12B illustrates the situation after elbow 80 has been rotated about 15° from its initial medial position, such that angle θ now equals 60° ($\theta_2$). When elbow 80 is rotated further from this position by a distance P, the incremental horizontal movement $\Delta X_2$ of swivel axis X-2 will be approximately P cos $\theta_2$, or 0.5 P, while the incremental radial movement $\Delta Y_2$ of swivel axis X-2 will be approximately P sin $\theta_2$, or 0.866 P. Accordingly, it can be readily appreciated that the required horizontal movement of elbow carriage 30 away from stationary frame 20 decreases with each revolution of rotor 40, while the required radial movement of elbow collar 42 radially away from primary axis X-1 increases with each revolution of rotor 40. As elbow 80 continues moving through pipe opening 21 and approaches the orientation at which angle θ equals 90°, $\Delta X$ will approach zero (cos 90° being equal to zero) and $\Delta Y$ will approach P (sin 90° being equal to 1.0).

The rate of rotation of rotor 40 and weld arm 60 is selected such that inner surface 84 of elbow 80 rotates past weld head 70 at an average rate (i.e., an average circumferential speed) corresponding to the desired average rate of deposition of the cladding bead (typically measured in inches per minute). This average circumferential speed will vary to suit particular applications, depending on the physical characteristics of elbow 80, the size and metallurgical properties of the welding wire being used, and the capabilities of the welding equipment used to energize the system.

By virtue of the coordinated movements of elbow carriage 30 and elbow cradle 42, curved centreline 94 of elbow 80 will pass through reference plane RP at a constant average rate K. In the typical preferred usage of the apparatus, in which it is desired to apply a dense pattern of helical cladding beads to inner surface 84 of elbow 80, rate K will be equal to one average bead width per revolution about primary axis X-1. The bead width thus may also be considered as equivalent to the average pitch P of the helical cladding bead (which commonly will be approximately 3/16 of an inch, but other average pitches may be used to suit specific applications). Accordingly, average rate K may also be stated by the expression, K=P per revolution.

Figure 13:
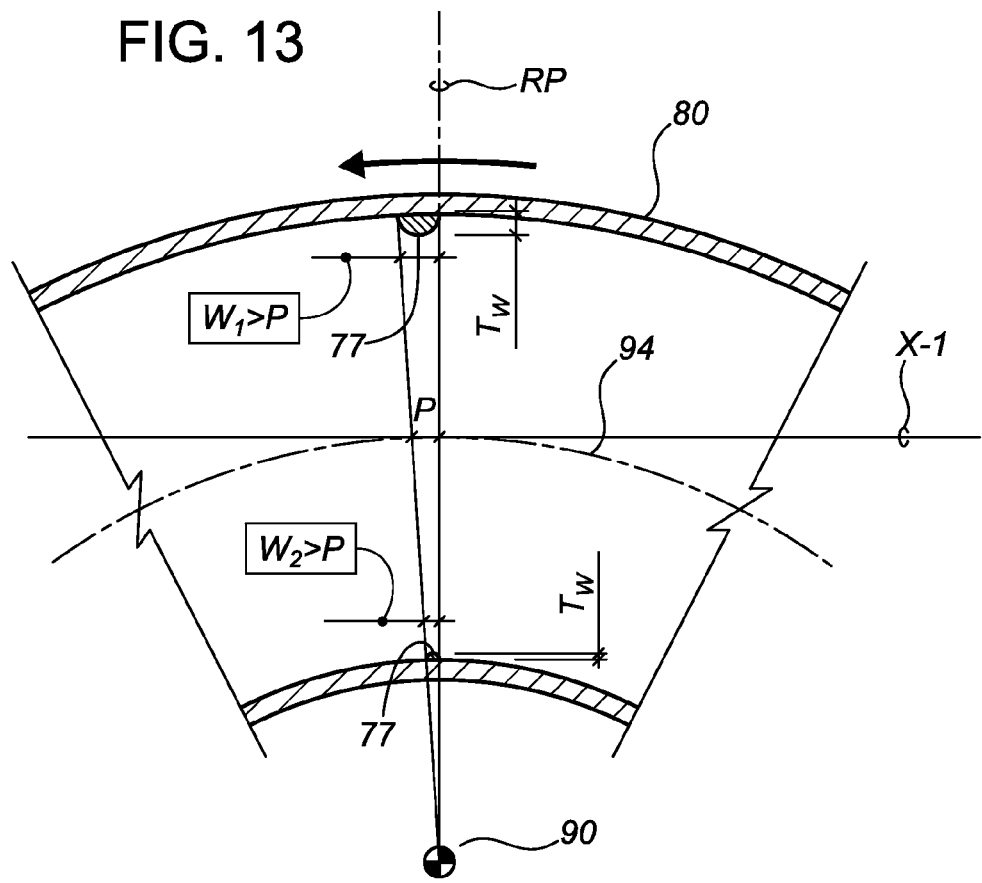
FIG. 13 is a schematic diagram illustrating the variability of the width of each pass of the weld head at different positions around the perimeter of a pipe elbow clad using the present invention.

Because of the curvature of elbow 80, the width $W_1$ covered by each pass of weld head 70 at inner surfaces 84 farthest from center of curvature 90 will be greater than average pitch P, and the covered pass width $W_2$ at inner surfaces 84 closest to center of curvature 90 will be less than average pitch P. This inherent geometric relationship is illustrated in FIG. 13. Although the apparatus 10 of the invention can be operated such that rotor 40 and weld arm 60 rotate about primary axis X-1 at a constant rate, this will result in a cladding bead 77 that has varying dimensional properties from one position to another around the perimeter of elbow 80 (assuming that welding wire 74 feeds to weld head 70 at a constant rate). This result might be acceptable in some applications. It is highly preferable, however, for cladding bead 77 to be of substantially uniform average thickness $T_w$ (as measured radially with reference to curved centreline 94).

For this reason, the preferred embodiment of apparatus 10 incorporates variable-rate rotation means, for varying the rate at which rotor 40 and weld arm 60 rotate about primary axis X-1 during each revolution. The rate of rotation will increase as rotor 40 approaches the six-o'clock position (as in FIGS. 3 and 5), and it will decrease as rotor 40 approaches the twelve-o'clock position (as in FIGS. 4 and 6). As a result of this variable-rate rotation, the average thickness $T_w$ of cladding bead 77 can be kept substantially uniform. The rotational speed variations required to achieve this result can be easily determined using well-known methods of trigonometric analysis.

FIG. 4 illustrates the configuration of elbow 80, rotor 40, and weld arm 60 in the twelve-o'clock position, after a 180° rotation from the position shown in FIG. 3. It can be readily appreciated from this view how weld arm 60 remains disposed within elbow 80 without interference therewith, while weld head 70 remains spatially fixed. FIG. 4 also illustrates how center of rotation 90 of elbow 80 remains substantially coincident with reference plane RP, while orbitally rotating about primary axis X-1.

Figure 6:
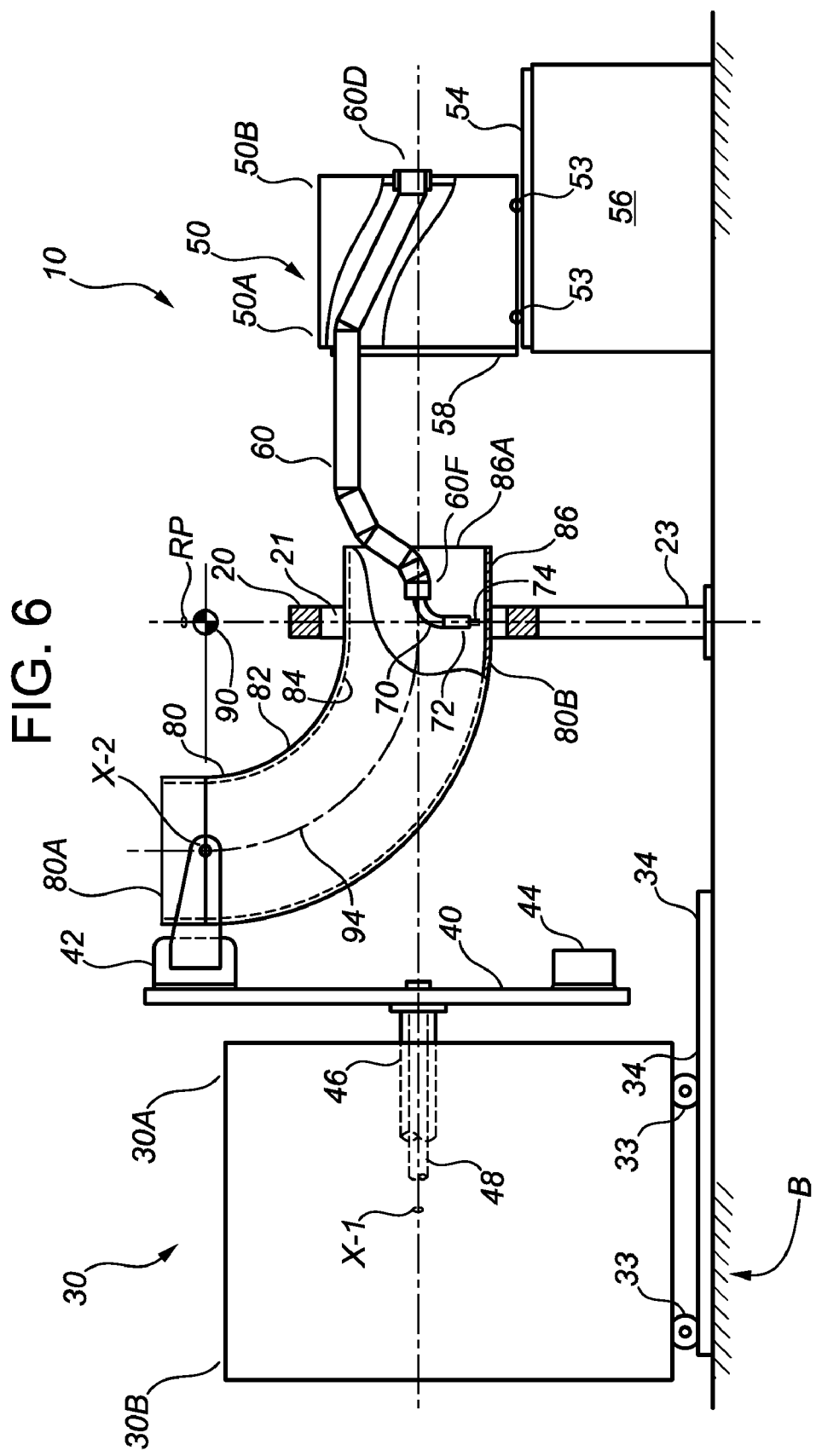
FIG. 6 is a schematic elevation of the apparatus with a pipe elbow in a primary terminal position, and with the rotor in the twelve-o'clock position.

The apparatus 10 is operated in the manner described above until elbow 80 is in a primary terminal position generally as shown in FIG. 5 (or FIG. 6). In this context, "primary terminal position" means that the weld head has reached a point where cladding of inner surface 84 of the curved portion of elbow 80 is intended to be stopped. At this stage (with a first half of elbow 80 having received a continuous internal helical cladding bead), elbow 80 is disengaged from apparatus 10, turned 180°, and remounted to apparatus 10 in a medial position, with weld head 70 positioned to begin depositing a cladding bead near the point where the first cladding bead began. Apparatus 10 is then reactuated as previously described, to deposit a continuous helical cladding bead on the second half of elbow 80.

In the Figures, elbow 80 is shown with a straight transition 86 which also can be clad using the apparatus 10. When elbow 80 has reached a primary terminal position (i.e., the point at which the straight centreline of transition 86 coincides with primary axis X-1), the longitudinal movement of elbow carriage 30 and the radial movement of elbow cradle 42 are stopped, but rotor 40 continues to rotate about primary axis X-1. As well, the variable-rate rotation means is disengaged, such that rotor 40 now rotates at a constant rate. The weld arm rotary drive means is preferably (but not of necessity) disengaged at this stage as well.

The effect of this change in the mode of operation of apparatus 10 is that straight transition 86 will be rotated axially about primary axis X-1 at a constant rate. Weld arm carriage 50 is then actuated so as to move longitudinally away from frame 20, at a constant rate of travel corresponding to the previously-referenced rate K (i.e., a longitudinal distance P per revolution of rotor 40). As a result, weld arm 60 is drawn toward the outer end 86A of transition 86, with weld head 70 depositing a continuous helical cladding bead to the inner surface thereof. Because transition 86 is straight, and because rotor 40 rotates at a constant rate during this phase of the operation, the helical bead deposited on the inner surface of transition 86 will be of substantially uniform width and thickness (provided that the wire feed speed remains constant).

When the bead reaches a secondary terminal position at or near the end of transition 86 as illustrated in FIG. 7 (with a first half of elbow 80 and the associated transition 86 having received a continuous internal helical cladding bead), elbow 80 is disengaged from apparatus 10, turned 180°, and remounted to apparatus 10 as previously described, to begin cladding the second half of elbow 80 (and any associated transition 86).

In accordance with an alternative embodiment of the apparatus and an alternative procedure, a transition 86 may be clad without requiring longitudinal movement of weld arm carriage 50. Instead, when elbow 80 has reached a primary terminal position (as shown in FIG. 5), elbow carriage 30 may be moved longitudinally at constant rate K away from frame 20, with elbow cradle 42 remaining in a set outboard position (as shown in FIGS. 5 and 6). Transition 86 will thus be drawn through pipe opening 21 while it continues to rotate at a constant rate, while weld head 70 remains substantially coincident with reference plane RP.

Figure 15:
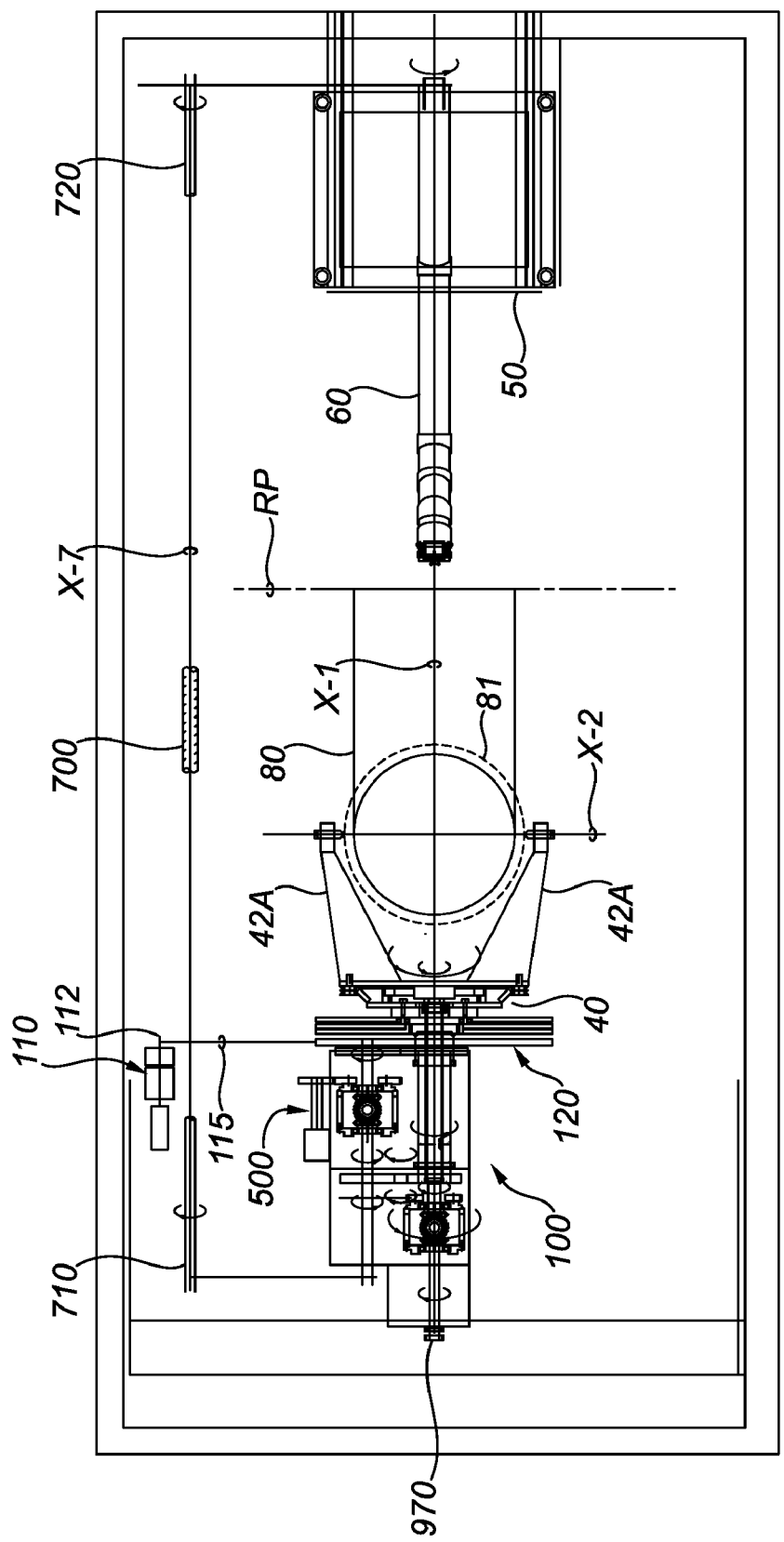
FIG. 15 is a plan view of the apparatus shown in FIG. 14.

As previously noted, various means may be devised for achieving the required coordinated longitudinal travel of elbow carriage 30, radial travel of elbow cradle 42 (and counterweight means 44), and rotational travel of rotor 40 and weld arm 60, in order for apparatus 10 to clad an elbow 80 in accordance with the procedure described above. In the preferred embodiment, these operational features are provided by means of a coordinated primary drive mechanism 100 as illustrated in FIGS. 16-20. Referring first to FIG. 15, a primary drive motor 110 is operably connected to a primary rotation mechanism 120 by means of a swivelling drive linkage 115 as explained in greater detail below.

Figure 16:
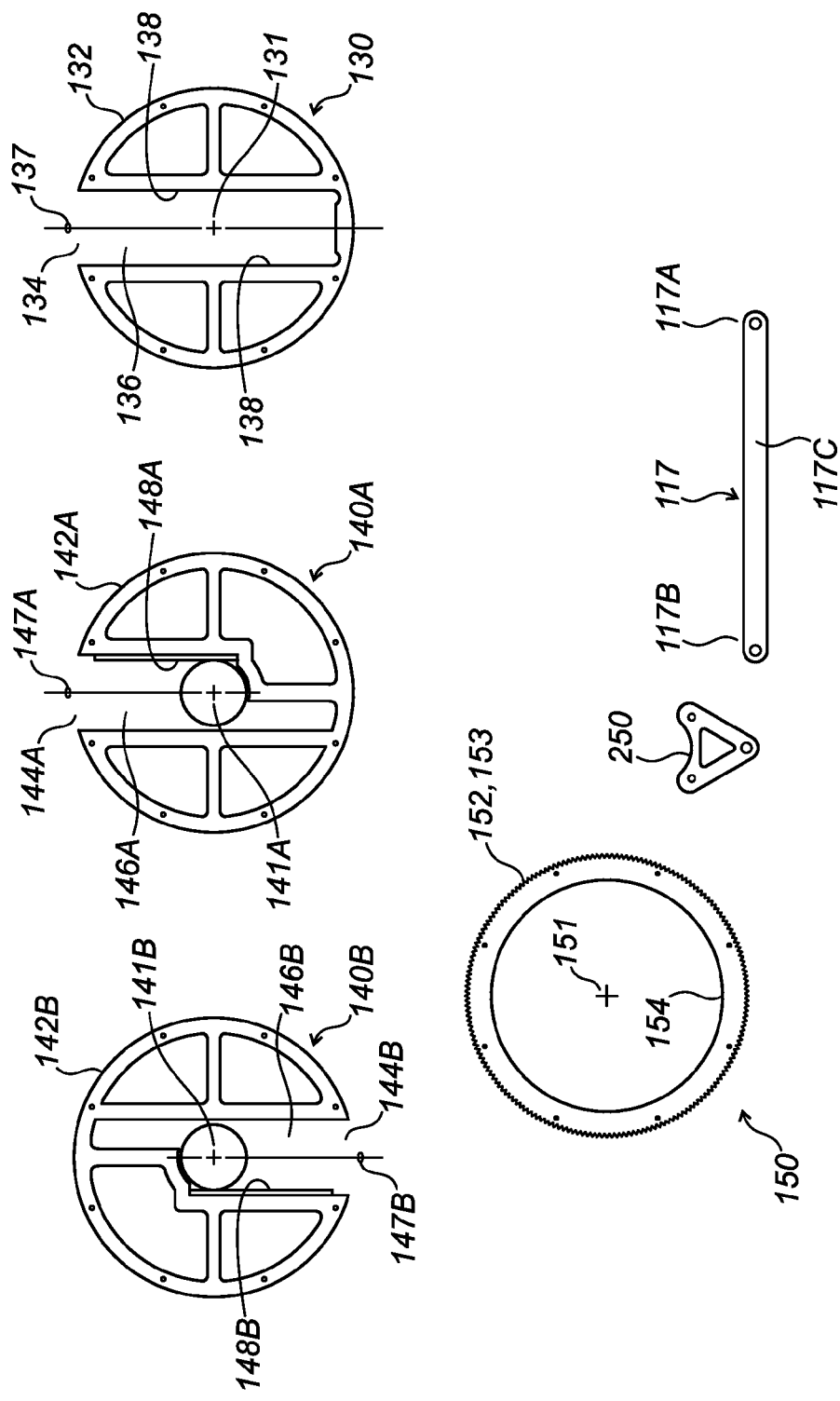
FIG. 16 is an illustration of selected components of the variable-rate rotation mechanism of the preferred embodiment of the invention.

As shown in FIG. 16, the components primary rotation mechanism 120 include a sliding drive plate 130, first and second rack plates 140A and 140B, and a circular ring gear 150. Sliding drive plate 130 has a centerpoint 131 and a circular perimeter 132, with perimeter 132 being interrupted by a gap 134 opening into a radial slot 136 having a radial axis 137 and extending inward from perimeter 132 to a point beyond centerpoint 131. Radial slot 136 is bounded by two straight edges 138 which are parallel to and equidistant from radial axis 137.

As shown in FIG. 16, and except as indicated below, rack plates 140A and 140B may be substantially similar to each other. Each has a centerpoint 141A or 141B (for rack plates 140A and 140B respectively) and a circular perimeter 142A or 142B, with perimeter 142A (or 142B) being interrupted by a gap 144A (or 144B) opening into a radial slot 146A (or 146B) which extends inward from perimeter 142A (or 142B) to a point beyond centerpoint 141A (or 141B). Radial slot 146A (or 146B) has a radial axis 147A (or 147B), and is bounded on one side by a rack gear 148A (or 148B) offset from and parallel to radial axis 147A (or 147B). As viewed in FIG. 16, each rack gear 148A or 148B is offset an equal distance, and in a clockwise sense, from its corresponding radial axis 147A or 147B. The width of each rack gear 148A or 148B, as measured perpendicular to the plane of its corresponding rack plate, is greater than the thickness of its corresponding rack plate, and preferably at least twice that thickness. Each rack gear 148A or 148B is mounted to its corresponding rack plate 140A or 140B so as to be flush with one face of thereof, with the excess rack width projecting beyond the other face of the rack plate. More specifically, and with reference to the views shown in FIGS. 16 and 19, rack gear 148A is flush with the far face of rack plate 140A, and rack gear 148B is flush with the near face of rack plate 140B.

Ring gear 150 has a centerpoint 151, a continuous circular outer perimeter 152 with continuous gear teeth 153, and a smooth concentrically circular inner perimeter 154.

Rack plate 140A is concentrically connected to sliding drive plate 130, with radial axis 147A of rack plate 140A aligned with radial axis 137 of sliding drive plate 130, and with gap 144A of rack plate 140A aligned with gap 134 of sliding drive plate 130. The resultant assembly of rack plate 140A and sliding drive plate 130 may be referred to as slide assembly 160.

Ring gear 150 is concentrically connected to rack plate 140B by means of suitable spacers and fastening means, so as to provide a space 156 between ring gear 150 and rack plate 140B. The resultant assembly of ring gear 150 and rack plate 140B may be referred to as slide assembly 170.

Figure 18:
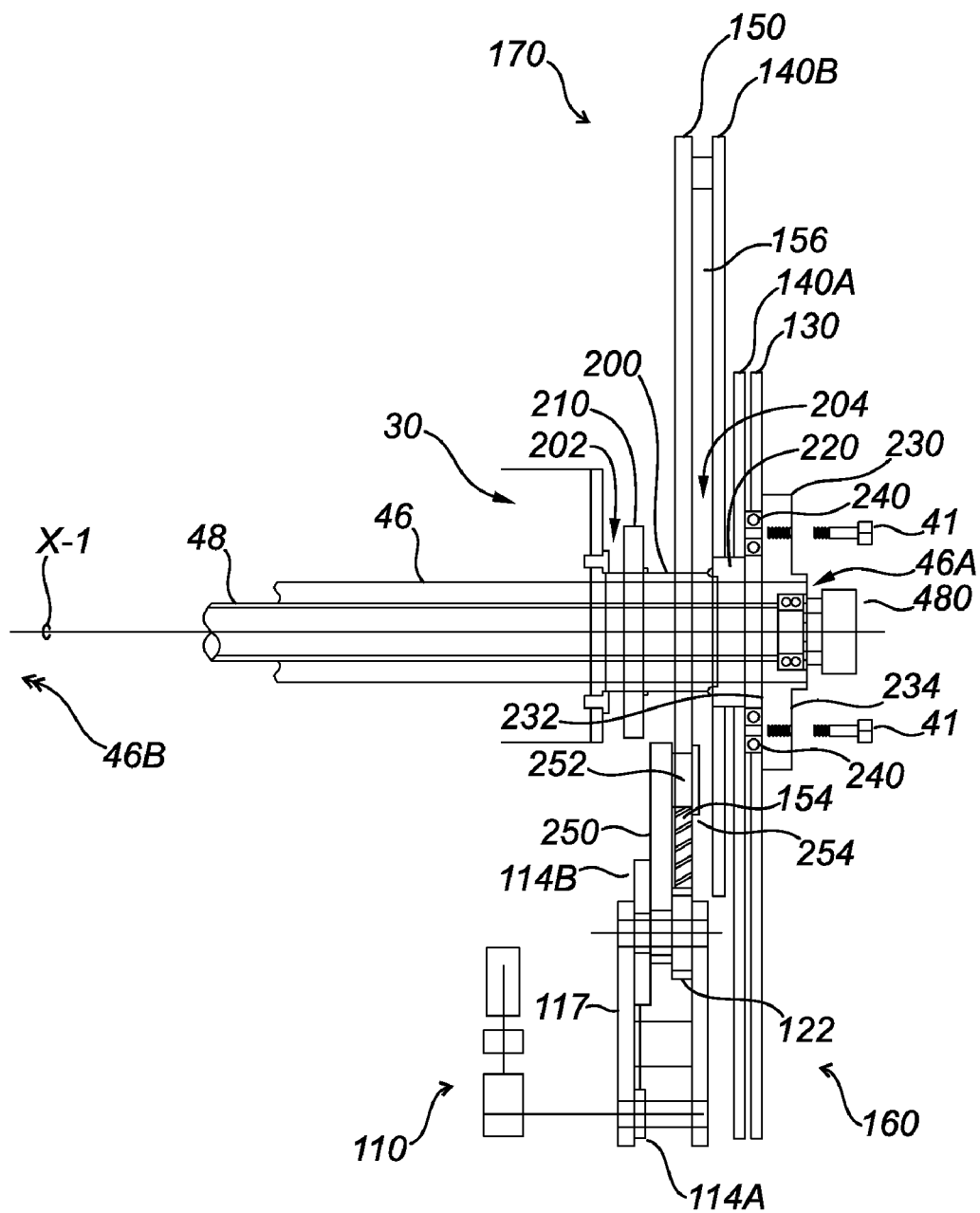
FIG. 18 is a side view of the variable-rate rotation mechanism configured as in FIG. 17.
Figure 19:
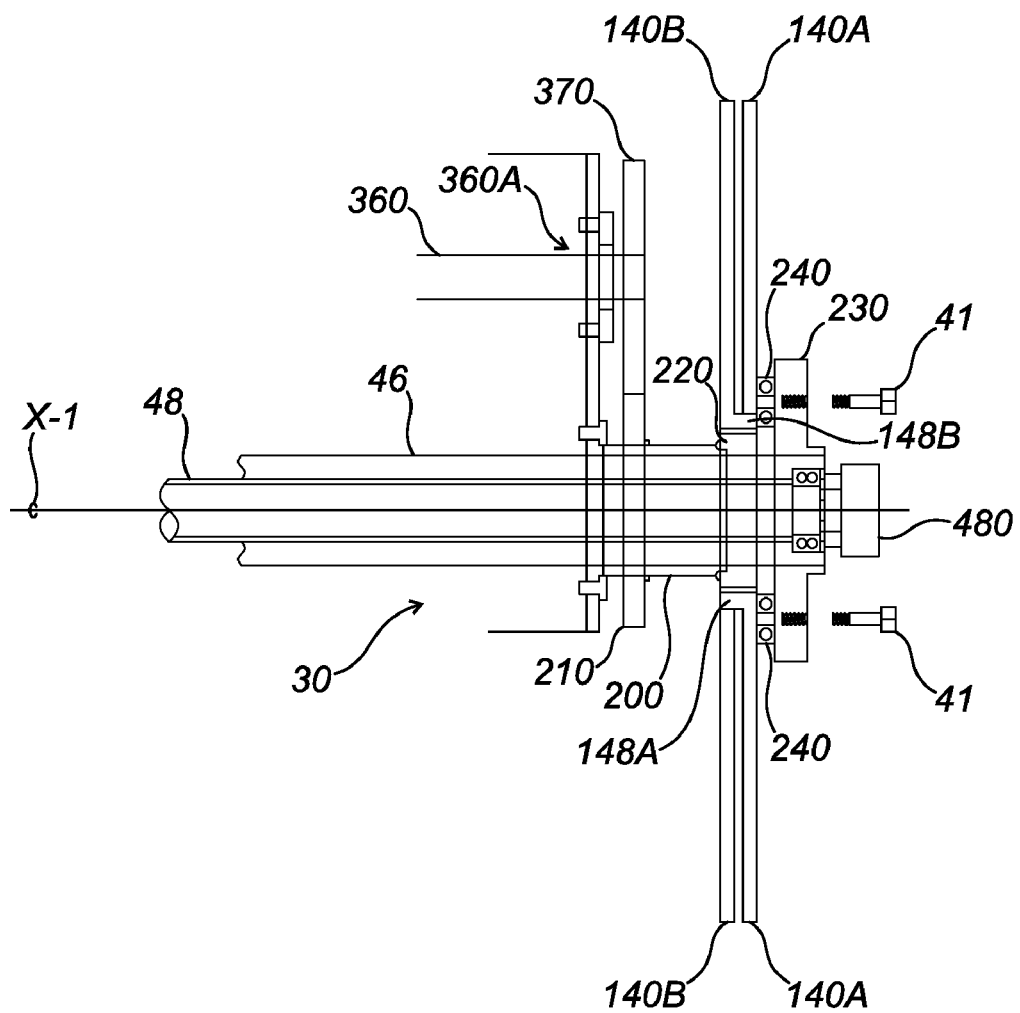
FIG. 19 is a top view of the variable-rate rotation mechanism as in FIG. 17, with the mechanism's ring gear and sliding drive plate omitted for clarity to illustrate the inter-engagement of the mechanism's rack plates.

FIG. 18 is a side view illustrating how slide assemblies 160 and 170 are mounted in association with primary drive shaft 46. Primary drive shaft 46 has a rotor end 46A which extends from elbow carriage 30 toward stationary frame 20, and terminates at an outer end 46B disposed within elbow carriage 30. A sleeve 200 is positioned over rotor end 46A of primary drive shaft 46 so as to be freely and concentrically rotatable about primary drive shaft 46. Sleeve 200 has a first end 202 and a second end 204, plus a first gear wheel 210 concentrically mounted around sleeve 200 toward first end 202 as shown. A second gear wheel 220 is concentrically mounted to second end 204 of sleeve 200; second gear wheel 220 has a central opening through which primary drive shaft 46 passes, such that second gear wheel 220 is free to rotate with sleeve 200 about primary axis X-1, independently of primary drive shaft 46. For initial assembly purposes, slide assembly 170 may be concentrically positioned over rotor end 46A of primary drive shaft 46, with ring gear 150 disposed toward elbow carriage 30, such that rack gear 148B engages the teeth of second gear wheel 220 (as best seen in FIG. 19). Slide assembly 160 is then concentrically positioned over rotor end 46A of primary drive shaft 46, with sliding drive plate 130 disposed toward rotor end 46A, and such that rack gear 148A also engages the teeth of second gear wheel 220. When slide assemblies 160 and 170 have been thus installed, rack gear 148A and rack gear 148B are aligned with each other, on opposite sides of second gear wheel 220 (as may be best seen in FIG. 19), and slide assemblies 160 and 170 are, for the moment, concentric with primary drive shaft 46.

As shown in FIG. 18, a hub flange 230 is then connected to rotor end 46A of primary drive shaft 46. Hub flange 230 has a central opening to allow secondary drive shaft 48 to pass through hub flange 230 as shown. Hub flange 230 has a first face 232 disposed toward elbow carriage 30 and toward sliding drive plate 130, and a second face 234 to which rotor 40 is mounted (preferably by means of a plurality of mounting bolts 41). A set of four drive rollers 240 are positioned in association with outer face 232, radially equidistant from the center of hub flange 230 (i.e., equidistant from primary axis X-1) and forming a rectilinear pattern such that the drive rollers 240 are disposed within radial slot 136 of sliding drive plate 130, with one pair of drive rollers 240 engaging each of the straight edges 138 of sliding drive plate 130.

In the preferred embodiment, primary drive motor 110 is mounted to elbow carriage 30 and therefore moves longitudinally therewith. As previously mentioned, primary drive motor 110 is operably connected to primary rotation linkage 120 by means of swivelling drive linkage 115. As may be seen in FIGS. 15 and 20, primary drive motor 110 has an output shaft 112 oriented parallel to primary axis X-1. A sprocket 114A is mounted to output shaft 112 so as to be rotated thereby.

Figure 14A:
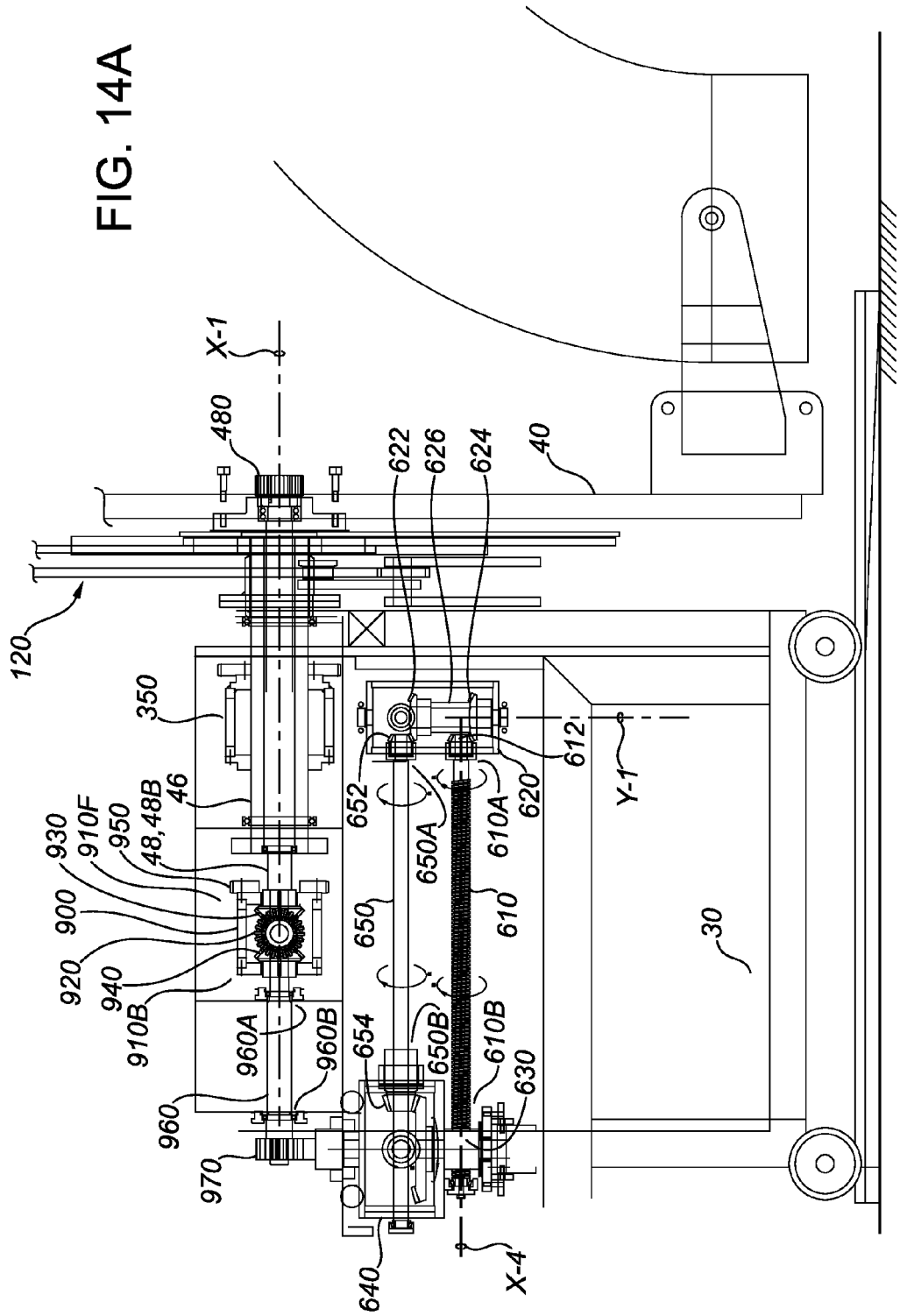
FIG. 14A is an enlarged elevation of the elbow carriage drive means shown in FIG. 14.

In the preferred embodiment, swivelling drive linkage 115 includes a rigid link 117, the outboard end 117A of which is mounted over output shaft 112 adjacent to sprocket 114A, but so as to be freely rotatable about output shaft 112 independently of the rotation thereof. As shown in FIGS. 14A and 18, rigid link 117 preferably comprises a pair of steel bars 117C, although it will be appreciated that alternative constructions using on a single bar 117C are possible. Rotatably and concentrically mounted to inboard end 117B of rigid link 117 (using suitable bearings) are a sprocket 114B and a ring gear drive pinion 122, as may be seen in FIG. 20. A drive chain 119 is disposed around sprockets 114A and 114B, such that actuation of primary drive motor 110 will cause sprockets 114A and 114B to rotate at the same speed, while swivelling drive linkage 115 (comprising sprockets 114A and 114B, rigid link 117, and drive chain 119) is free to swivel independently about output shaft 112. The sizes of sprockets 114A and 114B and ring gear drive pinion 122 will be selected to suit desired mechanical ratios, in accordance with well-known mechanical engineering principles.

Also forming part of swivelling drive linkage 115 (as may be seen in FIGS. 16 and 20) is a roller bracket 250 mounted to the inboard end 117B of rigid link 117 so as to be swivelable about the common axis of sprocket 114B and ring gear drive pinion 122. Roller bracket 250 is fitted with a pair of retainer rollers 252 arranged such that the axes of retainer rollers 252 are the vertices at the base of an isosceles triangle, with the axis of sprocket 114B and ring gear drive pinion 122 being the third vertex. Roller bracket 250 is mounted to ring gear 150 such that ring gear drive pinion 122 engages gear teeth 153 of ring gear 150 while retainer rollers 252 engage the smooth inner perimeter 154 of ring gear 150. As shown in FIG. 18, each roller 252 preferably has a circumferential flange 254 on one side, to help keep retainer rollers 252 laterally in position on ring gear 130. In the illustrated embodiment, roller bracket 250 is disposed adjacent to the inner side of ring gear 150 (i.e., nearer elbow carriage 30). By virtue of the space 156 provided between ring gear 150 and rack plate 140B, flanges 254 will not interfere with rack plate 140B as retainer rollers 252 travel along inner perimeter 154 of ring gear 150.

Figure 20:
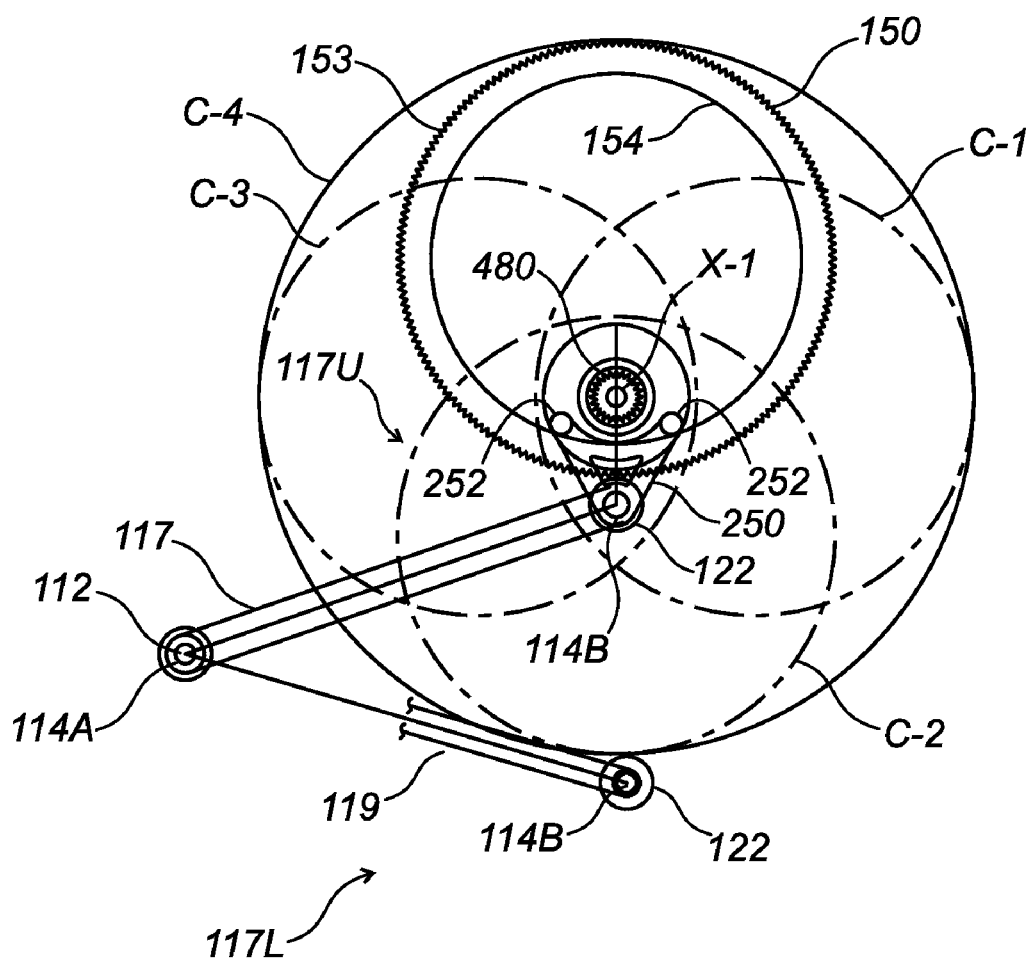
FIG. 20 is a frontal elevation illustrating the range of orbital rotation of the variable-rate rotation mechanism when in an offset configuration.

Having reference to FIG. 20, it may now be appreciated that when primary drive motor 110 is actuated, with slide assemblies 160 and 170 clustered together so as to remain concentric with primary axis X-1, the rotation of ring gear drive pinion 122 will cause rotation of ring gear 150 (and, therefore, slide assemblies 160 and 170) concentrically about primary axis X-1. This rotation will be transferred from sliding drive plate 130 to hub flange 230 by means of drive rollers 240, in turn causing rotation of primary drive shaft 46 and rotor 40. When the apparatus is in the configuration described (i.e., with slide assemblies 160 and 170 concentric), all rotational movement will be at a constant rate, which will be desirable when cladding a straight transition 86 of a pipe elbow 80 as previously discussed.

Figure 17:
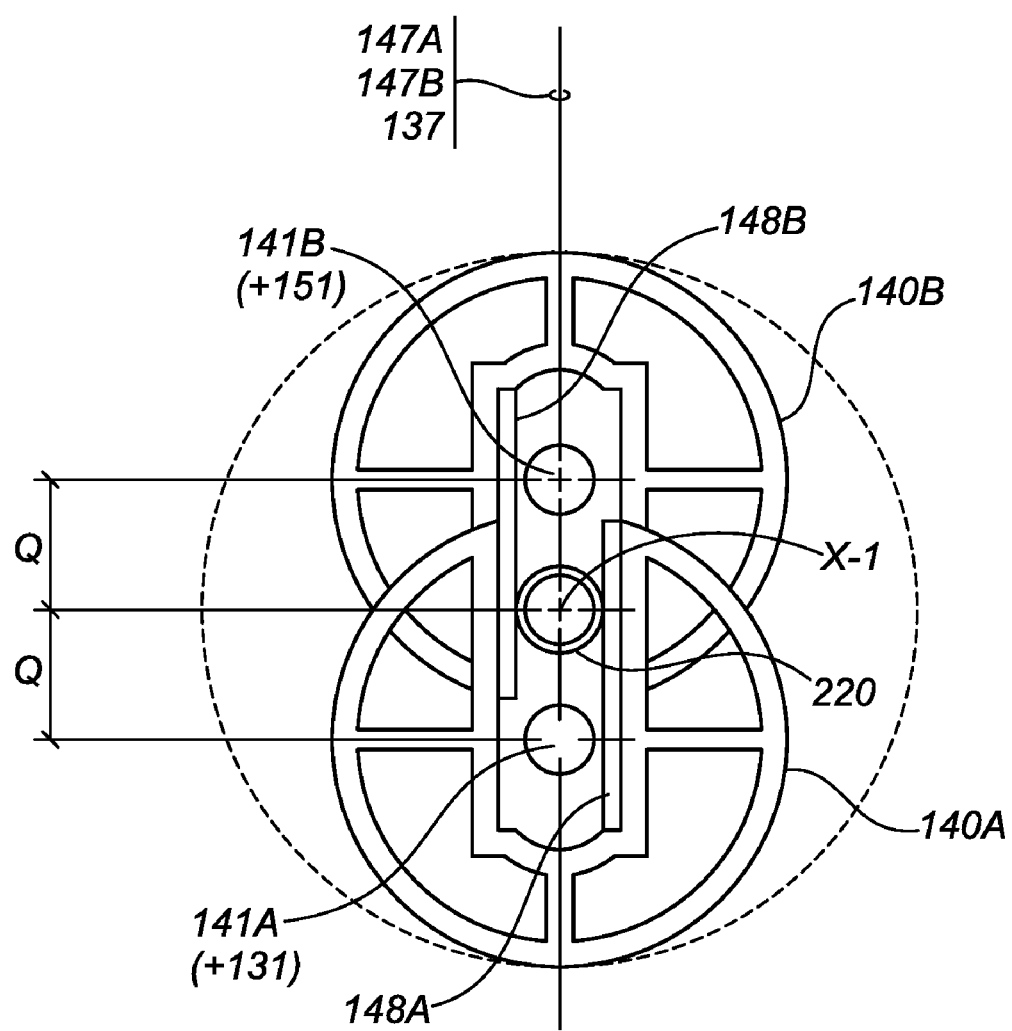
FIG. 17 is a frontal elevation of the variable-rate rotation mechanism in an offset configuration.

However, for purposes of cladding the curved portion of a pipe elbow 80, slide assemblies 160 and 170 are spread apart along their coincident radial axes (147A/137 and 147B, respectively), such that their respective centerpoints 141A and 141B will be offset by an equal distance Q from primary axis X-1 (as shown in FIG. 17). Now, the rotation of gear wheel 122 will still cause slide assembly 170 to rotate about primary axis X-1, but the rotation will be eccentric due to the fact that centerpoint 141B of slide assembly 170 is offset from primary axis X-1. The result of this eccentric rotation is that the rate of rotation of the combined rotational linkage assembly (i.e., slide assemblies 160 and 170) about primary axis X-1 will vary during each revolution, as will the rate of rotation imparted to primary drive shaft 46 by drive rollers 240 (which remain effective to rotate hub flange 230 despite being offset from centerpoint 131 of sliding drive plate 130, since they remain at all times in contact with straight edges 138 of radial slot 136 of sliding drive plate 130 irrespective of the offset of slide assemblies 160 and 170). Whereas rigid link 117 of swivelling drive linkage 115 will remain in a fixed spatial position when slide assemblies 160 and 170 are concentric with primary axis X-1, when slide assemblies 160 and 170 are offset, rigid link 117 will swivel about output shaft 112 and oscillate between a lower position 117L and an upper position 117U as the rotational linkage assembly rotates (i.e., one oscillation cycle for each rotation of the rotational linkage assembly).

The eccentric rotation of offset slide assemblies 160 and 170 may be particularly well understood with reference to FIG. 20. In FIG. 20, slide assembly 170 (incorporating gear 150) is shown in an uppermost position, with rigid link 117 being in upper position 117U. At this stage, slide assembly 160 would be in a position corresponding to circle C-2 in FIG. 20. When slide assemblies 160 and 170 have rotated 180° so as to be in a position corresponding to circle C-2, their positions will be correspondingly reversed. When slide assemblies 160 and 170 have rotated 90°, their positions will correspond to circles C-1 and C-3 (or vice versa). Accordingly, it will be appreciated that slide assemblies 160 and 170, with each revolution about primary axis X-1, will describe an outer circular path corresponding to circle C-4 in FIG. 20, said circle C-4 being concentric with primary axis X-1 and having a radius that will vary depending on offset distance Q.

The variability of the rotation speed will vary directly with the offset distance Q. The appropriate offset distance Q for a given application may be easily determined using known mathematical calculations (or, alternatively, by trial and error). More particularly, the appropriate offset will depend on the relative curvature ratio of the elbow 80 being clad (i.e., the relative curvature ratio, for purposes of this specification, being defined as the ratio of curvature radius 92 to inner elbow radius R2). In other words, an elbow having a lower relative curvature ratio will require a greater offset than an elbow having a larger relative curvature ratio.

Figure 15A:
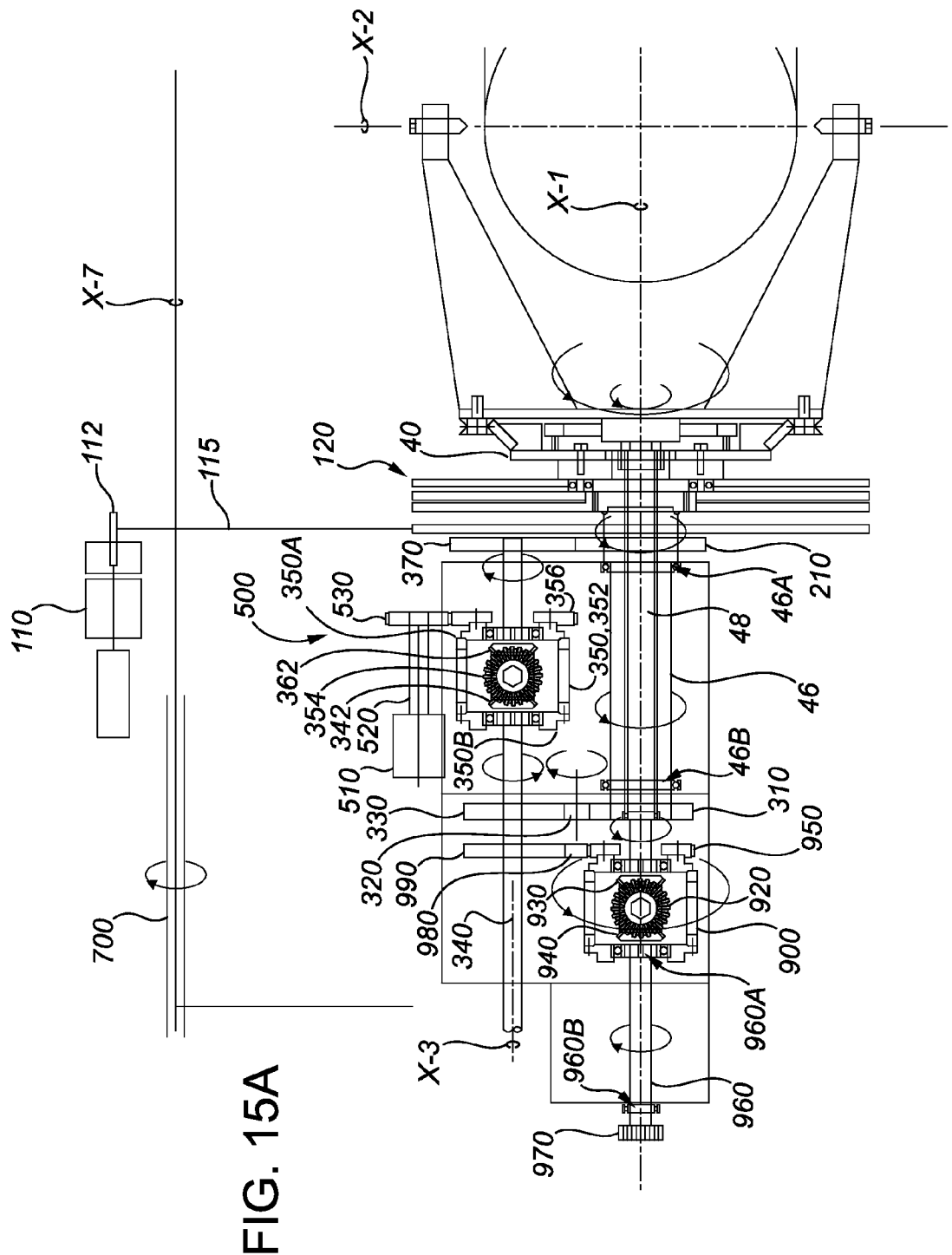
FIG. 15A is an enlarged plan view of the elbow carriage drive means shown in FIG. 15.

It will be appreciated that slide assemblies 160 and 170 need to be maintained in a desired relationship (i.e., concentric or offset) as they rotate about primary axis X-1. In the illustrated embodiment, the actuation of primary drive motor 110 rotates primary drive shaft 46 clockwise when actuation begins with elbow 80 in a medial position. As shown in FIG. 15A, outer end 46B of primary drive shaft 46 has a concentrically-mounted gear wheel 310 which engages (and rotates counterclockwise) an idler gear 320 which in turn engages (and rotates clockwise) a gear wheel 330 mounted to a first auxiliary shaft 340 oriented parallel to primary axis X-1. First auxiliary shaft 340 has a centroidal axis X-3, a first end 340A extending toward inner end 30A of elbow carriage 30, plus a second end 340B. First end 340A of first auxiliary shaft 340 extends into a first cluster gear 350, which comprises:

- an outer case 352 having a front end 352F and a back end 352B;
- a bevel gear 354 rotatable about an axis perpendicular to and passing through axis X-3 of first auxiliary shaft 340;
- a bevel gear 342 mounted in association with back end 352B of outer case 352 and rotatable about axis X-3 independently of outer case 352, so as to be operably engaged with bevel gear 354;
- a bevel gear 362 mounted in association with front end 352F of outer case 352 and rotatable about axis X-3 independently of outer case 352, so as to be operably engaged with bevel gear 354; and
- an exterior gear wheel 356 concentric with axis X-3 and fixedly mounted to outer case 352 in association with front end 352F, such that rotation of gear wheel 356 will cause corresponding rotation of first cluster gear 350 as a whole.

First end 340A of first auxiliary shaft 340 engages bevel gear 342 of first cluster gear 350. A second auxiliary shaft 360, coaxial with first auxiliary shaft 340, has a first end 360A and a second end 360B. Second end 360B extends through an opening in exterior gear wheel 356 so as to operably engage bevel gear 362 of first cluster gear 350. First end 360A is fitted with a gear wheel 370 which engages first gear wheel 210 of sleeve 200, which is rotatably disposed around primary drive shaft 46.

As shown in FIG. 15A, the apparatus includes a slide adjustment mechanism 500 for setting or adjusting the relative positions of slide assemblies 160 and 170 (i.e., concentric or offset). Slide adjustment mechanism 500 includes a reversible auxiliary motor 510 having a drive shaft 520 fitted with a gear wheel 530 which engages exterior gear wheel 356 of first cluster gear 350. Gear wheel 356 thus serves to restrain rotation of first cluster gear 350 when auxiliary motor 510 is idle, and to rotate first cluster gear 350 upon actuation of auxiliary motor 510. It can be appreciated, therefore, that auxiliary motor 510 can be actuated to rotate first cluster gear 350 in a first direction (clockwise or counterclockwise as the case may be), thereby rotating second auxiliary shaft 360 and gear wheel 370 in the same first direction, thereby causing rotation (in the opposite direction) of first gear wheel 210, sleeve 200, and second gear wheel 220. The ultimate effect of these mechanical interactions is that second gear wheel 220 rotates relative to primary shaft 46, with the consequence that second gear wheel 220 correspondingly rotates relative to slide assemblies 160 and 170, and, due to the engagement of second gear wheel 220 with rack gears 148A and 148B, shifting the positions of slide assemblies 160 and 170 relative to each other (i.e., adjusting offset distance Q).

As previously explained, clockwise rotation of primary drive shaft 46 will result in clockwise rotation of first auxiliary shaft 340, which in turn engages first cluster gear 350 and results in counterclockwise rotation of second auxiliary shaft 360 due to the operative interaction of bevel gears 342, 354, and 362. Second auxiliary shaft 360 in turn rotates second gear wheel 220 on sleeve 200, so as to rotate sleeve 200 clockwise. The various components of the mechanism described immediately above are sized and configured in accordance with well-known engineering principles such that sleeve 200 will be rotated at the same rate (i.e., constant or variable, depending on the offset Q of slide assemblies 160 and 170) as the rotation of primary drive shaft 46 and rotor 40. This rotation of sleeve 200, coordinated with that of rotor 40, results in second gear wheel 220 remaining in its preset position relative to rack gears 148A and 148B, thus maintaining slide assemblies 160 and 170 in their preset relative positions despite their rotation around primary axis X-1.

The relative positions of slide assemblies 160 and 170 (i.e., concentric or offset) may be set by means of a slide adjustment mechanism 500. In the embodiment illustrated in FIG. 15A, slide adjustment mechanism 500 includes a reversible auxiliary motor 510 having a drive shaft 520 fitted with a gear wheel 530 which engages exterior gear wheel 356 of first cluster gear 350. When auxiliary motor 510 is not in operation, the engagement of gear wheel 530 and exterior gear wheel 356 is effective to prevent rotation of outer case 352 of first cluster gear 350 (as will typically be the desired case during elbow-cladding operations). However, actuation of auxiliary motor 510 in one direction or the other (as required in a given situation) will cause corresponding rotation of outer case 352 about axis X-3. This results in rotation of second auxiliary shaft 360 and its attached gear wheel 370, in turn resulting in opposite rotation of first and second gear wheels 210 and 220 attached to sleeve 200. Since these rotations are independent of the apparatus's primary drive mechanism 100, and thus independent of the rotation of primary drive shaft 46, the rotation of second gear wheel 220 results in operative engagement between second gear wheel 220 and rack gears 148A and 148B, thereby adjusting the relative positions of slide assemblies 160 and 170 (as may be readily appreciated with reference to FIG. 17).

Accordingly, slide adjustment mechanism 500 may be actuated to spread slide assemblies 160 and 170 radially apart or to draw them inward toward a concentric configuration (i.e., with offset distance Q equal to zero), as desired operational parameters may require. Subject to any fine adjustment that might be desirable or necessary during operation of the apparatus, the relative positions of slide assemblies 160 and 170 will typically be set only once (i.e., in a desired offset position) for purposes of cladding the curved portion of a pipe elbow 80, and then returned to adjusted the concentric configuration for purposes of cladding a straight transition section 86 of elbow 80.

In the preferred embodiment of the invention, adjustment mechanism 500 is adapted such that slide assemblies 160 and 170 may be set in a desired configuration selected from a variety of relative curvature ratios (as previously defined), using control switches or selector means of any suitable type. Accordingly, the appropriate configuration of slide assemblies 160 and 170 will depend on the relative curvature ratio of elbow 80 to be clad, irrespective of its diameter. For example, the same slide assembly setting would be used for an elbow 80 having a 12-inch diameter as for an elbow 80 having a 24-inch diameter, if the radius of curvature 92 of the 24-inch elbow is twice that of the 12-inch diameter elbow.

In the preferred embodiment, the apparatus 10 is adapted such that slide assemblies 160 and 170 will be automatically moved to the concentric configuration when elbow 80 reaches a primary terminal position (as illustrated in FIG. 6) at which point weld head 70 has reached one end of the curved portion of elbow 80 and it is desired to begin cladding a straight transition section 86. This may be achieved, for example, by the use of limit switches in accordance with well-known technology.

Figure 21:
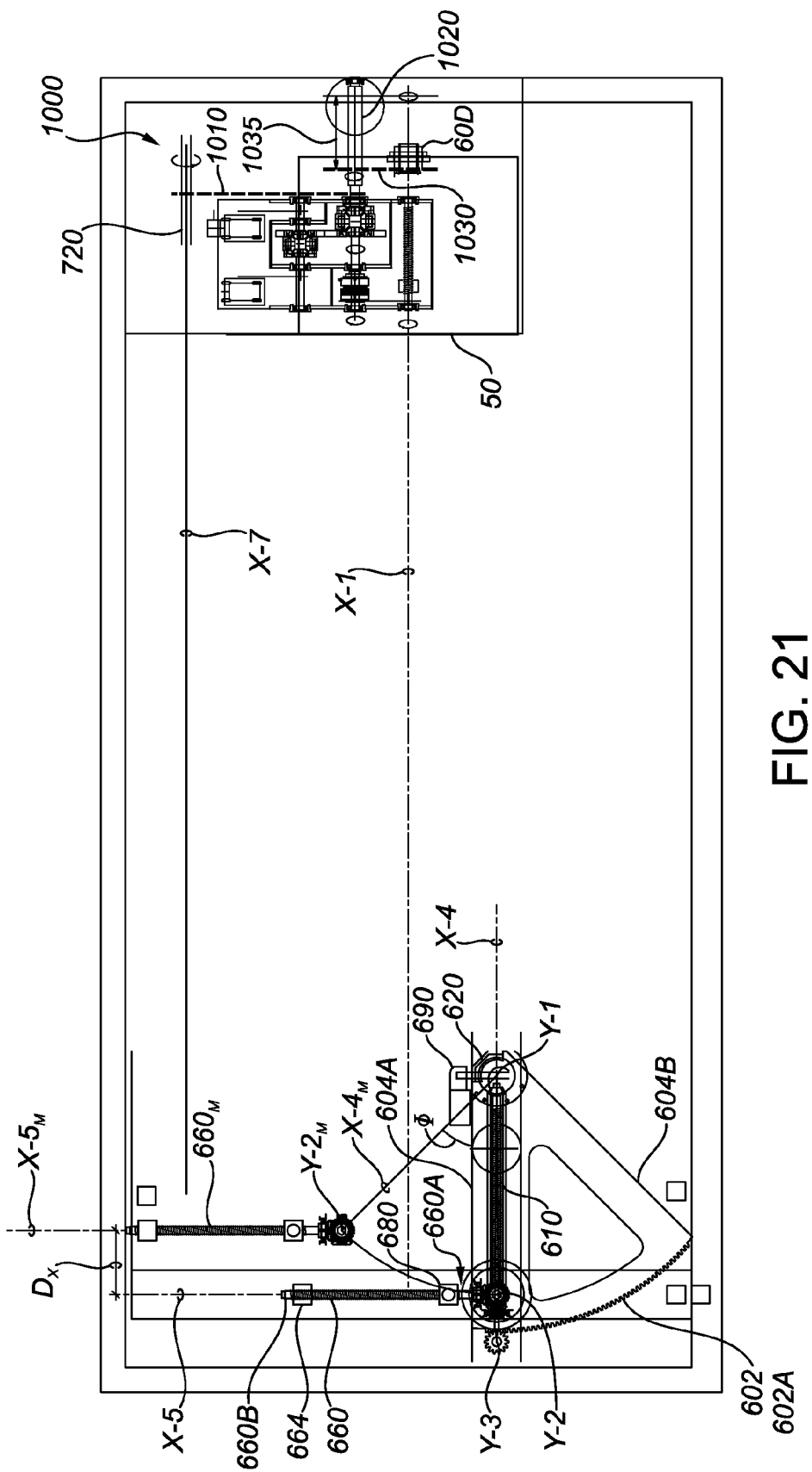
FIG. 21 is cross-sectional plan view of the apparatus illustrating the bull gear assembly of the elbow carriage drive means of the preferred embodiment.
Figure 21A:
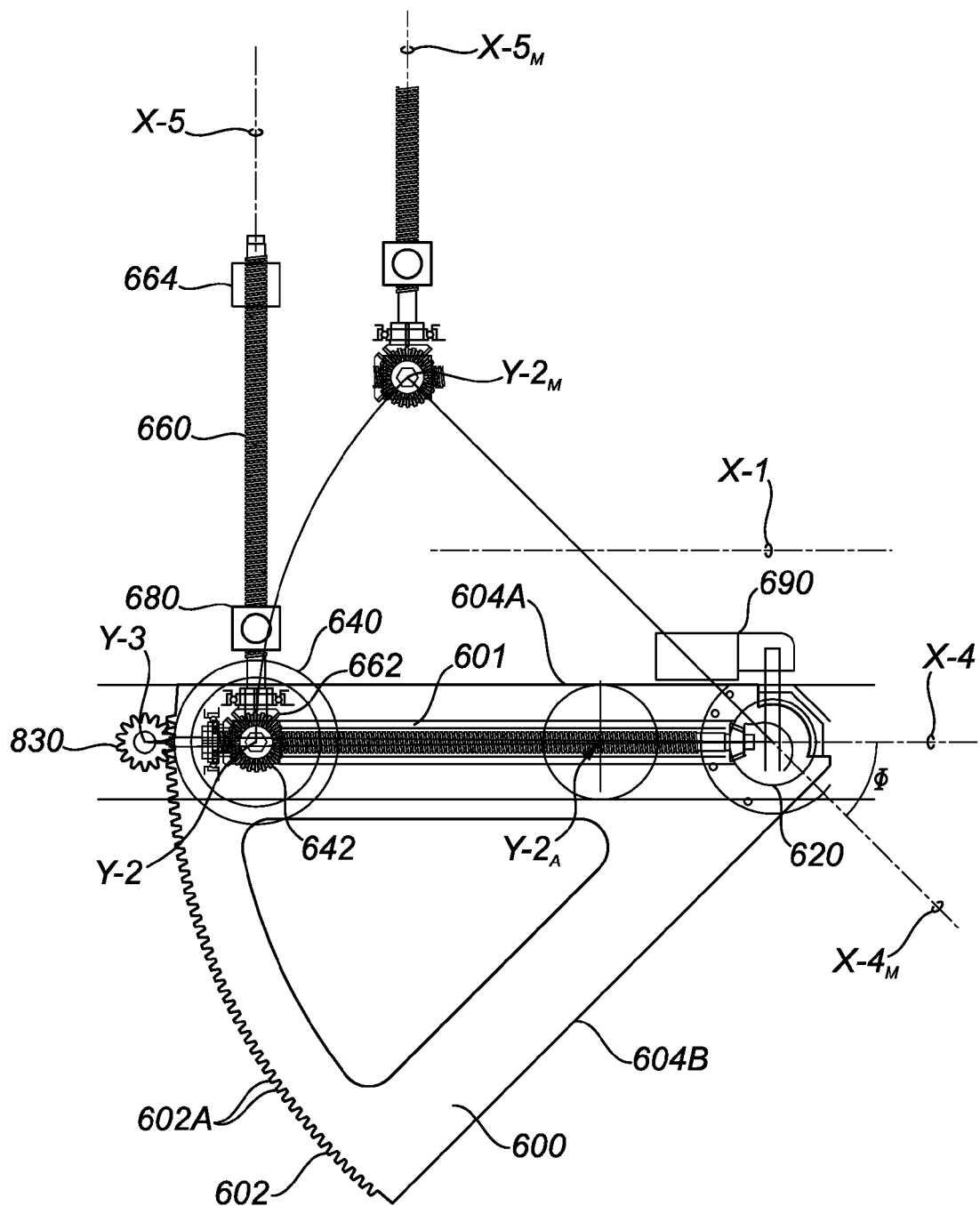
FIG. 21A is an enlarged plan view of the bull gear assembly shown in FIG. 21.

As previously discussed, the preferred mode of operation for the apparatus 10 of the invention requires elbow 80 to be drawn through pipe opening 21 of stationary frame 20 by means of incremental longitudinal movements of elbow carriage 30 coordinated with incremental radial movements of elbow cradle 42, such that the center of rotation 90 of elbow 80 at all times remains substantially coincident with reference plane RP. To achieve these operational criteria, the elbow carriage drive means 36 of the preferred embodiment includes a bull gear 600 located in association with outer end 30B of elbow carriage 30 and being pivotable about a spatially fixed vertical pivot axis Y-1, as illustrated in FIGS. 21 and 21A. As shown, bull gear 600 preferably corresponds approximately to a 45-degree circular segment having a curved perimeter 602 with gear teeth 602A, and bounded by side edges 604A and 604B. A first threaded shaft 610 is disposed in a radial slot 601 in bull gear 600 adjacent to side edge 604A so as to be rotatable about a horizontal axis X-4 which passes through pivot axis Y-1, and which will sweep through an arc corresponding to any rotation of bull gear 600 about vertical pivot axis Y-1. First threaded shaft 610 has an inner end 610A adjacent pivot axis Y-1 and an outer end 610B adjacent toothed perimeter 602 of bull gear 600.

As best seen in FIGS. 14A and 21A, inner end 610A of first threaded shaft 610 is disposed within a first gear housing 620 mounted to bull gear 600. First gear housing 620 encloses an upper bevel gear 622 and a lower bevel gear 624 connected by a vertical shaft 626 such that upper bevel gear 622 and lower bevel gear 624 will be concurrently rotatable about pivot axis Y-1. Inner end 610A of first threaded shaft 610 is fitted with a bevel gear 612 which engages lower bevel gear 624 within first gear housing 620, such that rotation of lower bevel gear 624 about pivot axis Y-1 will cause rotation of first threaded shaft 610 about horizontal axis X-4. Outer end 610B of first threaded shaft 610 passes through a threaded hub 630, which is disposed beneath and swivelably connected to a second gear housing 640 which houses a bevel gear 642 rotatable about a vertical axis Y-2 which passes through horizontal axis X-4 of first threaded shaft 610 and which is movable along horizontal axis X-4 as the position of hub 630 and second gear housing 640 is adjusted, as will be described below.

A smooth round shaft 650 having an inner end 650A and an outer end 650B extends between first gear housing 620 and second gear housing 640, as shown in FIG. 14A. At its inner end 650A, smooth shaft 650 is fitted with a bevel gear 652 which engages upper bevel gear 622 inside first gear housing 620. The outer end 650B of smooth shaft 650 extends through second gear housing 640 such that second gear housing 640 can slide along smooth shaft 650. However, smooth shaft 650 is also fitted with a bevel gear 654 which is keyed to smooth shaft 650 in such a way that bevel gear 654 will rotate with smooth shaft 650 while at the same time being free to slide along smooth shaft 650. Bevel gear 654 is rotatably retained by second gear housing 640 such that bevel gear 654 engages bevel gear 642.

Figure 22:
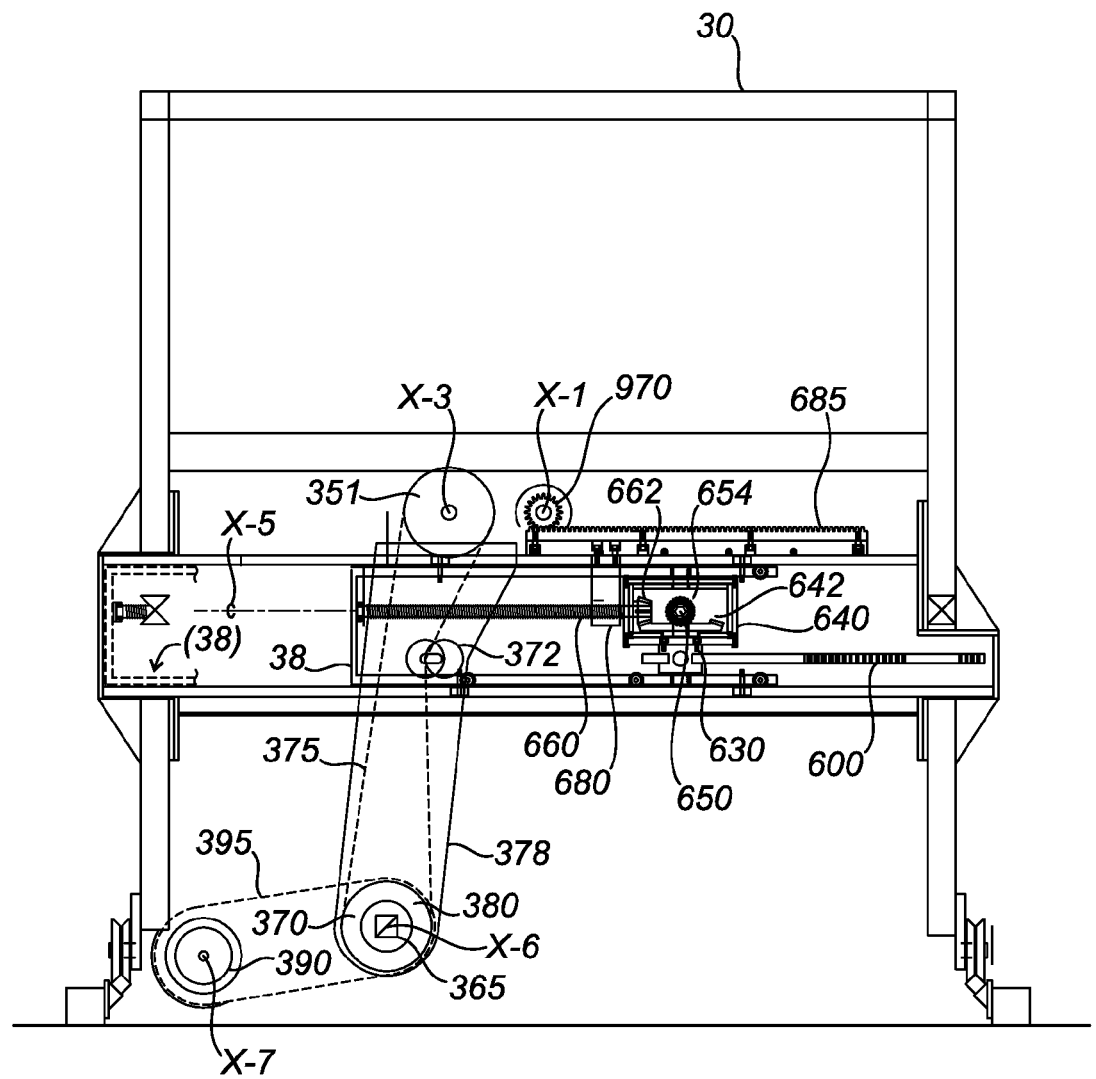
FIG. 22 is a cross-sectional elevation of the elbow carriage drive means (looking toward the stationary frame, as indicated by section markings in FIG. 14).

As shown in FIGS. 21 and 21A, the apparatus also includes a second threaded shaft 660 having a horizontal centroidal axis X-5, an inner end 660A fitted with a bevel gear 662, and an outer end 660B. Inner end 660A of second threaded shaft 660 projects into second gear housing 640 such that bevel gear 662 engages bevel gear 642, with horizontal axis X-5 oriented perpendicular to primary axis X-1 and passing through vertical axis Y-2. Outer end 660B of second threaded shaft 660 is retained by a bearing 664 mounted to a frame 670 which forms part of elbow carriage 30 and which is movable within elbow carriage 30 in a horizontal direction perpendicular to primary axis X-1. Accordingly, second threaded shaft 660 is able to move parallel to primary axis X-1 with longitudinal movements of elbow carriage 30, and is also able to move horizontally within elbow carriage 30 perpendicular to primary axis X-1, with horizontal axis X-5 of second threaded shaft 660 always remaining perpendicular to primary axis X-1. As best seen in FIG. 22, the horizontal movement of second threaded shaft 660 perpendicular to primary axis X-1 is enabled by mounting second threaded shaft 660 within a frame 38 which is movable relative within and relative to elbow carriage 30 by any suitable means (such as by use of rollers or slide members moving within corresponding tracks mounted to the main structure of elbow carriage 30)

Second threaded shaft 660 passes through a threaded hub 680, such that rotation of second threaded shaft 660 will cause hub 680 to travel along second threaded shaft 660. As best seen in FIG. 22, hub 680 is connected to the underside of a rack gear 685 which is oriented perpendicular to primary axis X-1 and which is movable parallel to primary axis X-1 with longitudinal movements of elbow carriage 30, while also being able to move horizontally within elbow carriage 30 perpendicular to primary axis X-1.

A reversible elbow size adjustment motor 690 is provided in association with first gear housing 620. Actuation of reversible motor 690 in a desired direction will cause the simultaneous rotation of first threaded shaft 610 and smooth shaft 650 as previously discussed. The rotation of first threaded shaft 610 will result in the movement of hub 630 and second gear housing 640 along first threaded shaft 610. The concurrent rotation of smooth shaft 650 will cause keyed bevel gear 654 to rotate bevel gear 642, which in turn will cause rotation of bevel gear 662 and second threaded shaft 660, thereby causing hub 680 to move along second threaded shaft 660 by the same amount as hub 630 and second gear housing 640 move along first threaded shaft 610 (both threaded shafts having the same diameter and thread pitch). This results in a corresponding movement of vertical axis Y-2 along first threaded shaft 610, to suit different sizes and configurations of elbow 80. This is further illustrated in FIG. 21A in which reference character Y-2$_A$ indicates an alternative location of vertical axis Y-2 (corresponding to a smaller diameter elbow).

By means of the described mechanism, therefore, the apparatus can be readily adjusted to accommodate elbows 80 of different curvature radii 92. More specifically, when the apparatus is properly set up for a given elbow 80, the distance between vertical axes Y-1 and Y-2 will equal the curvature radius 92 of elbow 80.

The functionality of bull gear 600 and related components described above may be appreciated from FIGS. 15, 15A, and 22, which illustrate further components of the coordinated drive mechanism of the apparatus. A first sprocket 351 is fitted to the outer end of first auxiliary shaft 340, which as previously described will rotate at the same rate (constant or variable, as the case may be) as primary drive shaft 46. A non-cylindrical drive shaft 365 (i.e., a solid or tubular shaft having a polygonal cross-sectional profile) having a first end 365A and a second end 365B, is mounted in a convenient fixed position so as to be rotatable about a horizontal axis X-6 parallel to primary axis X-1. In the illustrated embodiment, non-cylindrical drive shaft 365 is square in cross-section, but it could be of hexagonal, octagonal, or other polygonal or non-cylindrical cross-section.

A second sprocket 370 is mounted on non-cylindrical drive shaft 365 such that it can slide longitudinally along non-cylindrical drive shaft 365, and such that rotation of second sprocket 370 will cause corresponding rotation of non-cylindrical drive shaft 365. A first drive chain 375 is disposed around first sprocket 351 and second sprocket 370 as shown, preferably in conjunction with an idler sprocket 372 the position of which can be adjusted (e.g., manually or automatically, such as with a spring-loaded mechanism) in order to maintain a desired tension in first drive chain 375. Second sprocket 370 is mounted to a suitably stiff bracket 378 or other means connected to elbow carriage 30 such that second sprocket 370 will move along non-cylindrical drive shaft 365 in coordination with longitudinal movements of elbow carriage 30 parallel to primary axis X-1. A third sprocket 380 is non-slidingly fixed to drive shaft 365 at a selected point not within the range of sliding travel of second sprocket 370.

Figure 24:
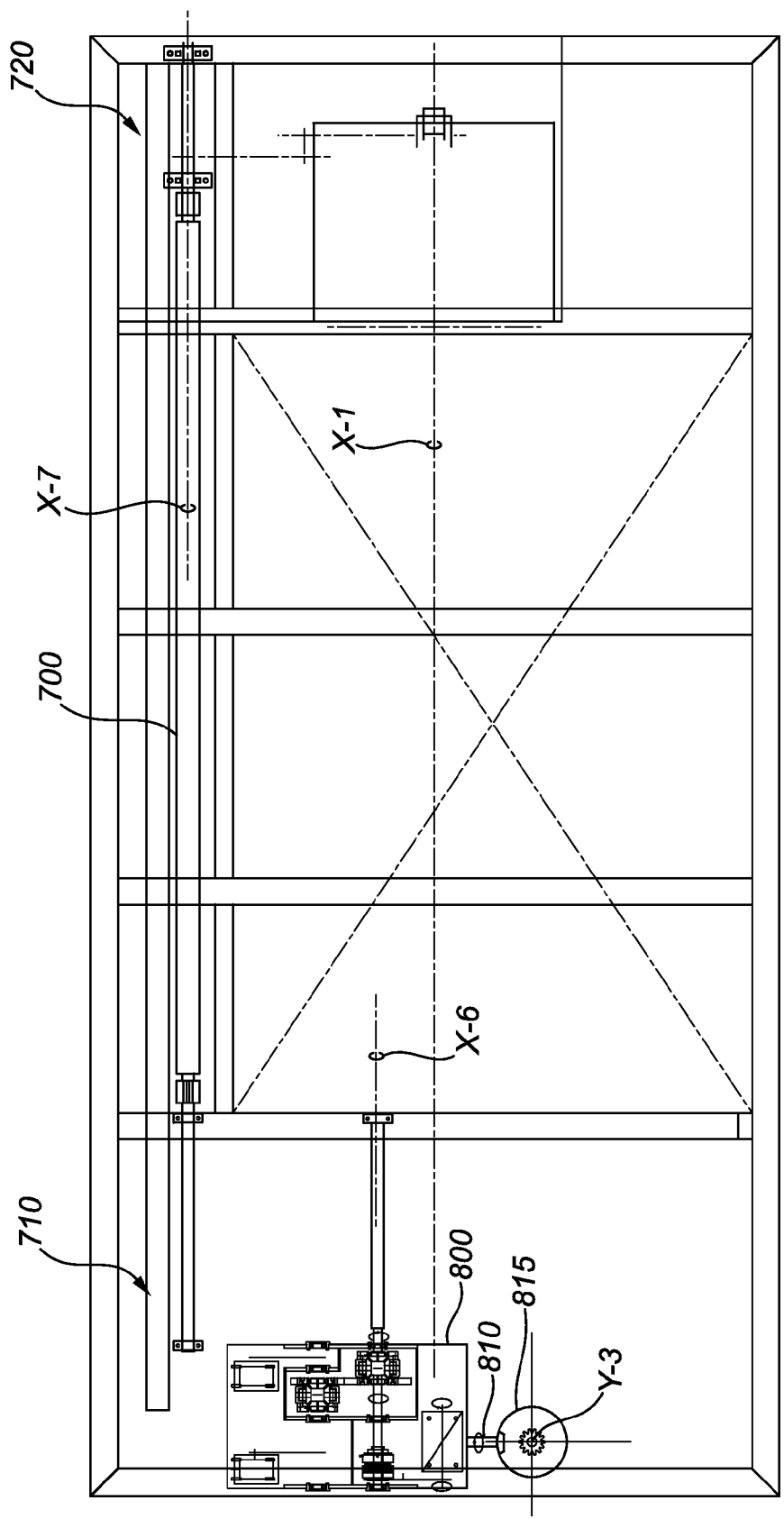
FIG. 24 is cross-sectional plan view of the apparatus, further illustrating components of the bull gear drive mechanism as well as the weld arm's rotary drive mechanism.

As shown in FIGS. 15, 21, and 24, a longitudinal drive shaft 700 having a centroidal axis X-7 parallel to primary axis X-1, extends from a first end 710 near elbow carriage 30 to a second end 720 near weld head carriage 50. A fourth sprocket 390 is mounted to longitudinal drive shaft 700 near the first end 710 thereof, and a second drive chain 395 is disposed around third sprocket 380 and fourth sprocket 390. By means of the mechanical linkages thus described, rotation of primary drive shaft 46 will cause corresponding rotation of both non-cylindrical drive shaft 365 and longitudinal drive shaft 700. Persons skilled in the art of the invention will appreciate that it is then a straightforward matter to provide weld arm rotation means (schematically indicated by reference character 1000 in FIG. 21) to transfer the rotation from longitudinal drive shaft 700 to weld arm carriage 50, such that weld arm 60 will rotate about primary axis X-1 in coordination with the rotation of primary drive shaft 46 and, in turn, the rotation of rotor 40 and elbow 80.

Weld arm rotation means 1000 may take the form of any suitable mechanical linkage, using appropriately sized gears, sprockets, shafts, and/or other components in accordance with well-known mechanical design principles. In the preferred embodiment, weld arm rotation means 1000 is integrated with weld arm carriage drive means 51, which enables selective longitudinal movement of weld arm carriage 50 for purposes of cladding a straight extension section 86 of a pipe elbow 80, as previously described. As generally illustrated in FIG. 21, a first linkage 1010 transfers rotation from longitudinal drive shaft 700 to a parallel non-cylindrical drive shaft 1020 (in substantially the same fashion as rotation is transferred from non-cylindrical drive shaft 365 to longitudinal drive shaft 700, as previously described). Non-cylindrical drive shaft 1020 Rotation from non-cylindrical drive shaft 1020 is then transferred to drive end 60D of weld arm 60 by means of a second linkage 1030 which is fixed to weld arm carriage 50 but which can slide longitudinally along non-cylindrical drive shaft 1020 while still being actuated thereby (in substantially the same fashion as second sprocket 370 slides along non-cylindrical drive shaft 365). The range of travel of second linkage 1030 along non-cylindrical drive shaft 1020 (which of course corresponds to the range of travel of weld arm carriage 50) is conceptually indicated by reference character 1035 in FIG. 21.

Figure 23:
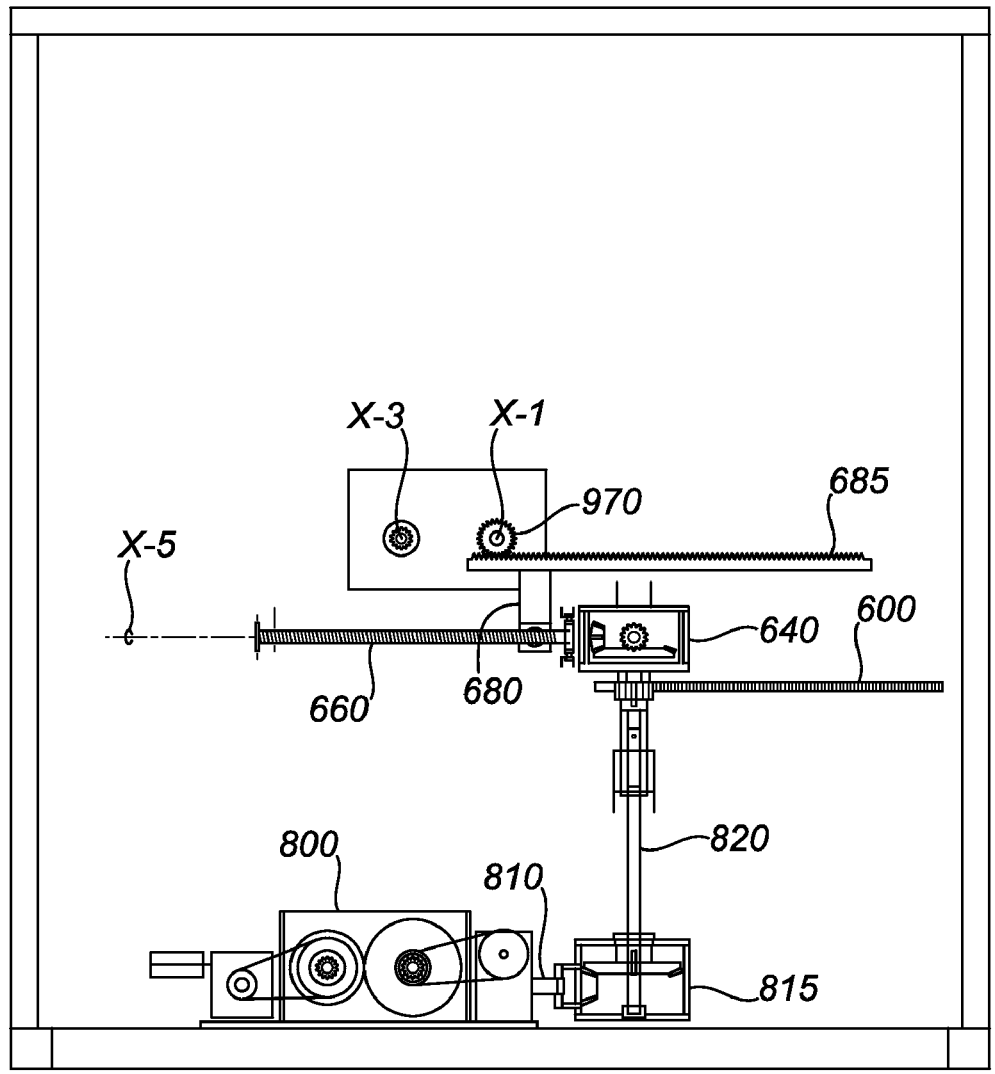
FIG. 23 is a further cross-sectional elevation (as indicated by section markings in FIG. 14), illustrating the bull gear drive mechanism in accordance with a preferred embodiment.

Referring now to FIG. 24, first end 365A of non-cylindrical drive shaft 365 engages a gearbox 800 which has a horizontal output shaft 810 which in turn rotates a vertical drive shaft 820 having a fixed vertical axis Y-3 (by means of a suitable mechanical linkage 815). As best seen in FIGS. 21A and 23, the upper end of vertical drive shaft 820 is fitted with a drive pinion 830 which engages teeth 600A of bull gear 600. Gearbox 800 is adapted and adjusted, for a given elbow 80, such that for each rotation of primary drive shaft 46, vertical axis Y-2 of hub 630 and second gear housing 640 will move about vertical axis Y-1 through an arc equal to pitch P; i.e., the desired average width of weld bead to be applied to interior surface 84 of elbow 80 on each pass of weld head 70.

Referring now to FIGS. 21 and 21A, it may be readily appreciated how the rotation of bull gear 600 about vertical axis Y-1 will result in incremental longitudinal movements ΔX of elbow carriage 30, along with incremental radial movements ΔY of rotor 40, as required to move elbow 80 through stationary frame 20 while maintaining center of rotation 90 of elbow 80 at all times substantially coincident with reference plane RP. In FIGS. 21 and 21A, bull gear 600 is shown in a position corresponding to the position of elbow 80 as shown in FIG. 5 (i.e., a terminal position), with axis X-4 of first threaded shaft 610 substantially parallel to primary axis X-1, and with second threaded shaft 660 at an terminal position farthest from vertical axis Y-1 as measured in a direction parallel to primary axis X-1. Also schematically illustrated, however, are the positions of axis X-4, second threaded shaft 660, hub 680, and axis X-5 when elbow 80 is mounted in a medial configuration—as indicated by reference characters X-4$_M$, 660$_M$, and X-5$_M$ respectively. Although not explicitly shown, the spatial position of bull gear 600 when elbow 80 is mounted in a medial configuration, can be readily visualized from these schematic representations. The rotational displacement of bull gear 600, first threaded shaft 610, and axis X-4 is indicated by angle Φ. The longitudinal displacement of second threaded shaft 660, hub 680, and axis X-5 is indicated as distance $D_X$, and the lateral displacement thereof is indicated as distance $D_Y$.

From a starting point with elbow 80 in a medial position (and with bull gear 600 in a corresponding configuration), actuation of primary drive motor 110 will cause coordinated rotation of rotor 40 and weld arm 60 about primary axis X-1, while also causing bull gear 600 to rotate counterclockwise about vertical axis Y-1, all as previously described, so as to move bull gear 600 toward the position shown in FIGS. 21 and 21A (i.e., corresponding to the primary terminal position of elbow 80 as shown in FIG. 5). Because the distance between vertical axes Y-1 and Y-2 is preset to equal curvature radius 92 of elbow 80, the incremental movements of vertical axis Y-1 parallel to primary axis X-1 as bull gear 600 rotates will be equal to the desired incremental longitudinal movements ΔX of elbow carriage 30. Similarly, the incremental movements of vertical axis Y-1 perpendicular to primary axis X-1 as bull gear 600 rotates will be equal to the desired incremental radial movements ΔY of rotor 40.

As bull gear 600 rotates, it draws elbow carriage 30 longitudinally away from stationary frame 20, due to the fact that hub 680 is connected to the underside of a rack gear 685, which necessarily moves longitudinally with elbow carriage 30. As can be appreciated from FIGS. 12A and 12B and related discussion, the initial longitudinal movement of hub 680 during the first rotation of rotor 40 (and therefore the initial longitudinal movement of elbow carriage 30), as elbow 80 begins moving from a medial position, will be approximately P cos 45°, which as will be recalled corresponds to the incremental longitudinal distance ΔX through which swivel axis X-2 needs to move in order to keep center of rotation 90 of elbow 80 coincident with reference plane RP. It will be appreciated that this relationship will be maintained as bull gear 600 rotates toward the position shown in FIGS. 21 and 21A.

As bull gear 600 rotates, it also causes the horizontal movement of second threaded shaft 660 perpendicular to primary axis X-1. It can be readily appreciated from FIGS. 12A and 12B that the incremental perpendicular movements of second threaded shaft 660 will correspond to the required incremental radial movements ΔY of rotor 40. Because of its connection to hub 680 on second threaded shaft 660, rack gear 685 will have identical movements perpendicular to primary axis X-1. These movements are transferred to secondary drive shaft 48 which coaxially disposed inside primary drive shaft 46. As shown in FIGS. 15, 15A, 18, and 19, secondary drive shaft 48 has an inner end 48A and an outer end 48B. Inner end 48A of secondary drive shaft 48 extends beyond hub flange 230 and connects to pinion gear 480 which is operably engageable with rack gears 45 of rotor 40 as will now be described.

Outer end 48B of secondary drive shaft 48 extends into a second cluster gear 900, which comprises:
- an outer case 910 having a front end 910F and a back end 910B;
- a bevel gear 920 rotatable about an axis perpendicular to and passing through primary axis X-1;
- a bevel gear 930 mounted in association with front end 910F of outer case 910 and rotatable about primary axis X-1 independently of outer case 910, so as to be operably engaged with bevel gear 920;
- a bevel gear 940 mounted in association with back end 910B of outer case 910 and rotatable about primary axis X-1 independently of outer case 910, so as to be operably engaged with bevel gear 920; and
- an exterior gear wheel 950 concentric with primary axis X-1 and fixedly mounted to outer case 910 in association with front end 910A, such that rotation of gear wheel 950 will cause corresponding rotation of second cluster gear 900 as a whole.

Outer end 48B of secondary drive shaft 48 operatively engages bevel gear 930. A third auxiliary shaft 960, which is coaxial with secondary drive shaft 48, has a first end 960A which operatively engages bevel gear 940, and a second end 960B connected to a pinion gear 970, which in turn is operably engaged with rack 685. As shown in FIG. 15A, exterior gear wheel 950 engages an idler gear 980 which engages gear wheel 990 mounted on first auxiliary shaft 340, which it will be recalled rotates in coordination with primary drive shaft 46 upon actuation of primary drive motor 110. As a result of the engagement of pinion gear 970 with rack 685, when rack 685 is stationary it serves to prevent rotation of third auxiliary shaft 960. Therefore, the clockwise rotation of secondary shaft 340 will cause clockwise rotation of second cluster gear 900 and consequent clockwise rotation of secondary drive shaft 48. The relative sizes of the various gears incorporated in the mechanism just described are selected so that primary drive shaft 46 and secondary drive shaft 48 rotate at the same rate. However, lateral movement of rack 685 in response to the rotation of bull gear 600 rotates pinion gear 970 and third auxiliary shaft 960. By virtue of the engagement of third auxiliary shaft 960 with second cluster gear 900, an incremental movement of rack 685 therefore causes an incremental rotation of secondary drive shaft 48 relative to primary drive shaft 46. As may be appreciated with reference to FIG. 9 in particular, this will cause pinion gear 480 to rotate relative to rotor 40 such that elbow collar 42 and counterweight means 44 move radially toward or away from primary axis X-1 (depending on the direction of relative rotation of secondary drive shaft 48), due the operative engagement of pinion gear 480 with rack gears 45A and 45B.

In accordance with the exemplary mechanisms described above, by using gears of suitable relative sizes, the rotation of bull gear 600 will result in radial movements of elbow collar 42 (and counterweight 44) in coordination with longitudinal movements of elbow carriage 30 so as to keep center of rotation 90 of elbow 80 coincident with reference plane RP as elbow 80 moves through stationary frame 20, thus facilitating the application of a uniform cladding bead on the inner surfaces of elbow 80.

It will be readily appreciated by those skilled in the art that various modifications of the present invention may be devised without departing from the essential concept of the invention, and all such modifications are intended to be included in the scope of the claims appended hereto. To provide only one non-limiting example, it would be possible to provide the various required coordinated movements of the elbow carriage 30, rotor 40, elbow cradle 42, counterweight means 44, and weld arm 60 using multiple independent drive mechanisms and control systems. Such alternative embodiments could incorporate computerized control systems, which could be readily adapted, using known programming methods, to control the incremental longitudinal movements of elbow carriage 30, and to control the incremental radial movements of elbow cradle 42 (and counterweight means 44), control functions which in the illustrated embodiment are served by bull gear 600 and associated mechanisms. Computerized control systems could also be used to provide for variable-rate rotation as an alternative to the variable-rate rotation means described herein.

In this patent document, the word "comprising" is used in its non-limiting sense to mean that items following that word are included, but items not specifically mentioned are not excluded. A reference to an element by the indefinite article "a" does not exclude the possibility that more than one of the element is present, unless the context clearly requires that there be one and only one such element.

What is claimed is:

1. A method for applying a helical cladding bead to the interior surface of a circularly curved pipe elbow having a first end, a second end, a curved centerline, a center of curvature, and a plane of curvature, said method comprising the steps of:
    (a) providing an elbow carriage having:
        a.1 a rotor rotatable about a primary axis; and
        a.2 an elbow collar mounted to the rotor and radially movable relative to the primary axis;
    (b) swivelably mounting the first end of the pipe elbow to the elbow collar such that the elbow's plane of curvature will coincide with the primary axis irrespective of the rotational position of the rotor or the radial position of the elbow collar;
    (c) supporting the second end of the pipe elbow on a steady rest such that the elbow's curved centerline substantially coincides with the primary axis where the primary axis intersects a reference plane transversely perpendicular to the primary axis;
    (d) providing a weld arm having: a drive end associated with weld arm rotation means for rotating the weld arm about the primary axis; a free end; and a weld head associated with said free end:
        d.1 said weld arm being configured such that the weld arm can be positioned inside the pipe elbow without physical interference when the elbow is positioned as in step (c); and
        d.2 said weld arm having weld head linkage means effective to maintain the weld head in a fixed spatial orientation irrespective of rotation of the weld arm about the primary axis;
    (e) positioning the free end of weld arm inside the pipe elbow with the weld head in close proximity to the reference plane;
    (f) coordinatedly rotating the rotor and the weld arm in a selected direction about the primary axis, while moving the elbow carriage in a selected direction parallel to the primary axis and moving the elbow collar in a selected radial direction relative to the primary axis, such that the pipe elbow rotates about the primary axis with its center of curvature orbiting around the primary axis in substantial coincidence with the reference plane; and
    (g) feeding welding wire to the weld head so as to deposit a cladding bead of molten metal on the interior surface of the pipe elbow.

2. The method of claim 1, further comprising the step of varying the rotational speed of the rotor during each rotation thereof.

3. The method of claim 2 wherein the rotational speed of the rotor is varied such that the cladding bead is of substantially uniform thickness.

4. The method of claim 2 wherein the rotational speed is variable between a maximum value when the rotor is in a first position and a minimum value when the rotor is in a second position diametrically opposite to said first position.

5. The method of claim 1 wherein the welding wire feed rate is constant.

6. The method of claim 1, further comprising the step of varying the welding wire feed rate during each rotation of the rotor.

7. The method of claim 6 wherein the welding wire feed rate is varied such that the cladding bead is of substantially uniform thickness.

8. The method of claim 7 wherein the welding wire feed rate is variable between a minimum value when the rotor is in a first position and a minimum value when the rotor is in a second position diametrically opposite to said first position.

* * * * *